United States Patent [19]
Hirt et al.

[11] Patent Number: 5,807,944
[45] Date of Patent: Sep. 15, 1998

[54] AMPHIPHILIC, SEGMENTED COPOLYMER OF CONTROLLED MORPHOLOGY AND OPHTHALMIC DEVICES INCLUDING CONTACT LENSES MADE THEREFROM

[75] Inventors: Thomas Hirt, Duluth, Ga.; Dieter Lohmann, Munchestein, Switzerland; Jens Höpken, Lörrach, Germany; Qin Liu, Corvallis, Oreg.

[73] Assignee: CIBA Vision Corporation, Duluth, Ga.

[21] Appl. No.: 671,278

[22] Filed: Jun. 27, 1996

[51] Int. Cl.$^6$ ........................................... C08F 30/08
[52] U.S. Cl. ..................... 526/279; 523/107; 525/937; 351/160 R
[58] Field of Search ................ 526/279; 523/107; 525/937; 351/160 R

[56] References Cited

U.S. PATENT DOCUMENTS

| | | | |
|---|---|---|---|
| 4,242,474 | 12/1980 | Shinohara et al. | 525/404 |
| 4,540,761 | 9/1985 | Kawamura et al. | 526/245 |
| 4,659,777 | 4/1987 | Riffle | 525/100 |
| 4,780,515 | 10/1988 | Deichert | 526/245 |
| 4,812,598 | 3/1989 | Chen | 523/107 |
| 4,888,389 | 12/1989 | Kennedy et al. | 525/131 |
| 5,010,141 | 4/1991 | Mueller | 525/276 |
| 5,115,056 | 5/1992 | Mueller et al. | 526/243 |
| 5,153,273 | 10/1992 | Kobayashi et al. | 525/412 |
| 5,314,961 | 5/1994 | Waifong et al. | |
| 5,357,013 | 10/1994 | Bambury et al. | 526/260 |
| 5,371,147 | 12/1994 | Spinelli et al. | |
| 5,534,605 | 7/1996 | Bamburg et al. | 526/260 |

FOREIGN PATENT DOCUMENTS

| | | |
|---|---|---|
| 0106218A1 | 9/1983 | European Pat. Off. . |
| 249416A2 | 5/1987 | European Pat. Off. . |
| 290109A2 | 5/1987 | European Pat. Off. . |
| 0267158A1 | 11/1987 | European Pat. Off. . |
| 0330615A2 | 2/1989 | European Pat. Off. . |
| 0330616A | 2/1989 | European Pat. Off. . |
| 0330617A1 | 2/1989 | European Pat. Off. . |
| 0330618A2 | 2/1989 | European Pat. Off. . |
| 0386249A1 | 7/1989 | European Pat. Off. . |
| 4113292 | 10/1992 | Germany . |
| 156953 | 4/1983 | Japan . |
| 131346 | 12/1986 | Japan . |
| 198652 | 4/1989 | Japan . |
| 096500 | 11/1990 | Japan . |
| 2276824 | 11/1990 | Japan . |
| 198228 | 3/1992 | Japan . |
| 105575 | 5/1993 | Japan . |
| WO9000411 | 7/1989 | WIPO . |
| WO9429756 | 6/1993 | WIPO . |
| WO9620964 | 7/1996 | WIPO . |
| WO9621167 | 7/1996 | WIPO . |
| WO9631792 | 10/1996 | WIPO . |

OTHER PUBLICATIONS

Synthesis of Polysiloxane–polyoxazoline Graft Copolymer by Hydrosilyation Reaction, Chujo, Yoshiki, et al., Polymer Bulletin 19, Spring 1988, pp. 435–440.

Synethis of Novem Macromonomers and Telechelics of Poly (2–alkyl–2–oxazolines)s, Shimano, Tasuo, et al., American Polymer Science, Part A: Polymer Chemistry, vol. 33, 2715–2723 (1995).

*Primary Examiner*—Melvyn I. Marquis
*Attorney, Agent, or Firm*—Michael U. Lee; R. Scott Meece

[57] ABSTRACT

The subject matter of the present invention is an amphiphilic, segmented copolymer of controlled morphology comprising at least one segment having high oxygen permeability, at least one segment having high ion and water permeability, the segments being linked together through a non-hydrolizable bond, and at least one polymerizable unsaturated group; a process for the preparation of the copolymer; to polymeric products obtainable by further polymerizing and optionally cross-linking the amphiphilic segmented copolymer, and to mouldings, especially contact lenses and other ophthalmic devices comprising a polymeric product of the invention. In a specifically preferred embodiment, the present invention relates to a contact lens comprising a polymeric product of the invention which is suited for extended periods of wear.

54 Claims, No Drawings

AMPHIPHILIC, SEGMENTED COPOLYMER OF CONTROLLED MORPHOLOGY AND OPHTHALMIC DEVICES INCLUDING CONTACT LENSES MADE THEREFROM

FIELD OF THE INVENTION

The present invention relates to an amphiphilic, segmented copolymer of controlled morphology comprising at least one segment having high oxygen permeability, at least one segment having high ion and water permeability, the segments being linked together through a non-hydrolizable bond, and at least one polymerizable unsaturated group; a process for the preparation of the copolymer; to polymeric products obtainable by further polymerizing and optionally cross-linking the amphiphilic segmented copolymer, and to mouldings, especially contact lenses and other ophthalmic devices comprising a polymeric product of the invention. In a specifically preferred embodiment, the present invention relates to a contact lens comprising a polymeric product of the invention which is suited for extended periods of wear.

DESCRIPTION OF THE RELATED ART

Materials which are employed for the production of contact lenses and other devices to be used in an ophthalmic environment must be "ophthalmically compatible", i.e. must not substantially damage the surrounding ocular tissue and ocular fluid during the time period of contact.

One ophthalmic compatibility requirement for contact lenses is that the lens must allow oxygen to reach the cornea in an amount which is sufficient for long-term corneal health. The contact lens must allow oxygen from the surrounding air to reach the cornea because the cornea does not receive oxygen from the blood supply like other tissue. If sufficient oxygen does not reach the cornea, corneal swelling occurs. Extended periods of oxygen deprivation causes corneal edema and the undesirable growth of blood vessels in the cornea. "Soft" contact lenses conform closely to the shape of the eye, so oxygen cannot easily circumvent the lens. Thus, soft contact lenses must allow oxygen to diffuse through the lens to reach the cornea.

Another ophthalmic compatibility requirement for soft contact lenses is that the lens must not strongly adhere to the eye. Clearly, the consumer must be able to easily remove the lens from the eye for disinfecting, cleaning, or disposal. However, the lens must also be able to move on the eye in order to encourage tear flow between the lens and the eye. Tear flow between the lens and eye allows for debris, such as foreign particulates or dead epithelial cells, to be swept from beneath the lens and, ultimately, out of the tear fluid. Thus, a contact lens must not adhere to the eye so strongly that adequate movement of the lens on the eye is inhibited.

In order to balance the ophthalmic compatibility and consumer comfort requirements in designing a daily wear soft contact lens, polymers and copolymers of 2-hydroxyethylmethacrylate (HEMA) were developed. These hydrophilic polymers move well on the eye and provide sufficient oxygen permeability for daily wear.

Improved oxygen permeability is achieved by siloxane-containing polymers. However, polysiloxanes are typically highly lipophilic. Polysiloxane lipophilicity promotes adhesion to the lens of lipids and proteins in the tear fluid, causing haze which interferes with vision through the lens.

There have been numerous attempts to blend the desirable hydrophilic properties of hydrophilic polymers, formed from monomers such as HEMA, with the desirable oxygen permeability of polymers formed from siloxane-containing monomers. DE-A-4113292 for example discloses ophthalmic mouldings produced from polydiorganosiloxane/poly(ester)car-bonate block copolymers wherein the chemical bonding of the polysiloxane and poly(ester)carbonate blocks is through an Si-O-aryl bond. The material is said to show good mechanical stability, flexibility and dimensional stability, high biological compatibility and should be easily producible. Also it is said not to absorb water and to be suitable for producing disposable contact lenses. This material, however, may not be crosslinked after production.

EP-A-386249 discloses oxygen-permeable shaped articles consisting of a block copolymer of the general formula A-B, A-B-A or B-A-B where 80% by weight or more of the monomer units constituting segment A comprise an alkyl methacrylate and 80% by weight or more of the monomer units constituting segment B comprise silicon-polymethacrylate monomer units. The shaped articles are produced from the block copolymer without further chemical modification by dissolving the copolymer in a solvent, casting the resulting solution and then removing the solvent therefrom. The shaped article is said to be characterized by having a high oxygen permeability. If the shaped article is made from a polymer solution prepared with a solvent having a solubility parameter of 7.3 to 9.2 $cal^{1/2}$ $cm^{-3/2}$, it is possible to create a structure in which the block copolymer has undergone a microphase-separation into microphases A and B and, moreover, wherein the phase composed of B (which comprises the oxygen permeable material) extends continuously from one surface of the shaped article to the other. In the production of these block copolymers, however, there is no teaching to control the size of the segments and to obtain "telechelic" copolymers. Water and ion permeability are not discussed in EP-A-386249.

EP-A-267158 discloses ophthalmic devices, such as contact lenses and intraocular implants, of a block copolymer containing polysiloxane and polyoxyalkylene oxide units possessing an advantageous blend of desirable properties. According to this document, a contact lens is produced, i.e. from block copolymers which are made from polyethylene oxide having terminal hydroxyl groups with polydimethylsiloxane having terminal hydroxyl groups and diisocyanates and hydroxyethylmethacrylate. Structure and morphology of these block copolymers including the exact arrangement of the individual blocks is not well defined.

EP-A-330615, EP-A-330616, EP-A-330617 and EP-A-330618 disclose wettable, oxygen-permeable contact lenses comprising block copolymers containing polysiloxane and polyoxyalkylene units which have a number of beneficial properties. The block copolymers, however, do not have a controlled and well defined structure of the individual blocks.

JP-A-61-289323 discloses a soft contact lens with high oxygen permeability comprising terminal blocks of an aromatic vinyl compound such as polystyrene, and a middle block of a conjugated diene polymer such as polybutadiene. These tri-block copolymers do not have terminal functional groups and possess an insufficient oxygen permeability.

JP-A-58-058519 discloses a contact lens material comprising a copolymer of silicon resin units having functional groups, e.g., vinyl groups, polyether units having functional groups, e.g., allyl groups, and silicon resin units having functional groups capable of reacting with the functional groups of the other components. Also for this copolymer, the structural arrangement of the individual blocks is not well defined.

U.S. Pat. No. 5,371,147 and U.S. Pat. No. 5,314,961 disclose block copolymers of a hydrophilic acrylate type monomer and a hydrophobic silicon-type acrylate having polymerizable terminal groups. Besides linear crosslinked products also star polymers are disclosed which are hydrophobic in the inner part and hydrophilic at the outer parts. These block copolymers did not lead to continuous morphologies of both hydrophilic and hydrophobic phases.

U.S. Pat. No. 5,115,056 discloses the copolymerization of poly(alkylene oxides) having polymerizable terminal vinyl groups with acrylates or methacrylates containing fluorine or silicon groups and other comonomers. The block copolymers obtained do not have a distinct controlled arrangement of the individual blocks.

EP-A-294416, EP-A-290109 and JP-A-02-004225 disclose block and graft copolymers on the basis of polydimethylsiloxanes and poly(2-alkyl-2-oxazoline). Sulfonates or alkylhalides are mentioned as initiators of the polymerization. Among the sulfonates, tosylates are preferred although the trifluoromethansulfonates (triflates) show a better ratio of the rate of initiation to the rate of continuous polymerization in the synthesis of the desired products. According to JP-A-2-4225, the cationic end groups are reacted with polysiloxanes containing mercapto or amino groups. The obtained polymers may be used as surfactant, cosmetic raw material, mould release agent, antifogging agent, antistatic agent, defoaming agent, textile oil, plastic improver, lustering agent or lubricant utilizing the properties inherent in the organo polysiloxane.

WO-A-94/29756 discloses interpenetrating networks of polysiloxane/polycarbonate block copolymers and methylmethacrylate. JP-A-05-117390 discloses the introduction of terminal hydroxyl groups on polyoxazolines by reacting the living end group with NaOH/MeOH.

The production of di- and triblock copolymers using 2-alkyl-2-oxazolines is further disclosed by Riffle et al. (I. Yilgor, R. S. Ward, J. S. Riffle, ACS Polymer Preprints, 28(2), 369, 1987; J. S. Riffle, I. Yilgor, U.S. Pat. No. 4,659,777 (1987); Q. Liu, J. Bronk, A. Verma, J. Wilson, R. M. Davis, J. S. Riffle, Polymer Preprints, 33(1), 215 (1992); W. Liu, G. R. Wilson, R. M. Davis, J. Riffle, Polymer 34, 3030 (1993); J. S. Riffle, G. Sinai-Zingde, J. M. DeSimone, A. M. Hellstern, D. H. Chen, I. Yilgor, Polymer Preprints, 29(2), 93 (1988)); Saegusa et al. (T. Saegusa, H. Ikeda, Macromolecules, 6, 805, (1973)); Y. Chujo, E. Ihara, H. Ihara, T. Saegusa, S. Kobayashi, T. Saegusa, Makromol. Chem., Suppl., 12, 11 (1985)) and Litt et al. (M. H. Litt, X. Swamikannu, ACS Symp. Ser., 286, 231 (1985)). Blocks of polydimethylsiloxane and polyethylene oxide (S. Kobayashi, M. Kaku, T. Tsutani, T. Saegusa, Pol. Bul., 9, 196, (1983)) or blocks of polybutadiene (T. Saegusa, H. Ikeda, loc. cit.) have been used. Functionalization of the terminal groups of these block copolymers has not been carried out or not been characterized exactly. Riffle et al., loc. cit. converted the living end groups through addition of KOH/MeOH without characterizing the terminal groups obtained. Other authors modified the polyoxazolines by addition of water or aqueous sodium hydrogen carbonate at 100° C. introducing terminal hydroxyl groups. Then, these hydroxyl groups have been reacted with methacrylic acid or acrylic acid chloride. Also methods have been developed to react a living end of the polymer chain directly with acrylic acid or methacrylic acid or a salt or activated ester thereof to obtain vinyl groups. Kobayashi et al. disclosed the reaction of the living cationic end group with 4-vinyl-benzyl alcoholate to produce a vinylic end group (Y. Shimano, K. Sato, S. Kobayashi, J. Polym. Sci., Part A, 33, 2715 (1995)).

Graft block copolymers were also produced by hydrosilylation of monoallyl terminated poly(2-oxazoline) and polysiloxane having Si—H units. A more rapid initiation than propagation seems to be possible also with the use of p-nitrobenzene sulfonates.

JP-A-2274712/1990 (Hokushin Kogyo K.K.) discloses several reactions for terminating a living polymerization of oxazolines. JP-A-04-085335 discloses the reaction of the cationic terminus of poly(2-alkyl or aryl-2-oxazolines) with primary, secondary or tertiary amines forming the terminal group of polyorgano siloxanes.

Graft copolymers have been produced also by cationic polymerization of THF, 2-methyl-2-oxazoline or polyisobutyl vinyl ether on partially triflated polymethylphenylsilylene; see Y. Hrkach et al., Gov. Rep. Announce. Index (U.S.) 1994, 94(20), Abstract No. 455,301, 1994.

The overview of the prior art given above shows that, while there is a great number of documents relating to copolymeric materials comprising oxygen permeable, hydrophobic blocks or segments and water- and ion-permeable, hydrophilic blocks or segments which materials are said to be suitable for the production of ophthalmic devices, especially contact lenses, there is no teaching in the prior art of ophthalmic devices directed towards the production of amphiphilic segmented copolymers having a controlled length of the hydrophobic and hydrophilic segments which for this reason can provide a defined microphase morphology of the copolymer leading to a defined and reproducible structure of the contact lens material. The latter is essential for the achievement of high oxygen as well as water and ion-permeability and appropriate on-eye mobility of a lens suitable for true extended wear.

Also, while certain known soft poly(HEMA) contact lenses have been approved for extended wear periods of up to about 6 nights of overnight wear and seven days of daily wear, the consumer cannot safely and comfortably wear those lenses for extended periods of seven days or more, because the oxygen permeability is insufficient. True extended wear (i.e., seven days or more) of those lenses may result, at a minimum, in corneal swelling and development of surface blood vessels in the cornea.

SUMMARY OF THE INVENTION

It is thus an object of the present invention to provide new materials suitable for the production of ophthalmic devices, especially soft contact lenses which materials, because of their controlled morphology, exhibit valuable properties, especially high oxygen transmissability, good movement on the eye, high permeability for ions and water, relatively low water uptake, mechanical softness and flexibility, low creep, high optical clarity, high hydrolytic and thermal stability. These materials should further be obtainable easily and reproducibly by rapid polymerization at low costs.

A further object of the invention is to provide a process for the preparation of such materials.

Still a further object of the invention is to provide mouldings, especially ophthalmic devices for vision correction including contact lenses and biomedical articles comprising such materials, e.g., intraocular lenses, artificial cornea and membranes.

Still a further object of the invention is to provide a contact lens which is suitable for extended periods of wear, e.g., for a period of up to 30 days, in continuous, intimate contact with ocular tissue and tear fluid.

The objects of the invention could surprisingly be achieved on the basis of the finding, that amphiphilic segmented copolymers comprising oxygen-permeable segments and water- and ion-permeable segments can be "tailored" by controlled polymerization of hydrophilic monomers, preferably those specifically defined hereinafter, in the presence of a hydrophobic polymer carrying initiator groups, preferably those specifically defined hereinafter, or vice versa, i.e. by controlled polymerization of hydrophobic monomers in the presence of a hydrophilic polymer carrying initiator groups and that polymerizable unsaturated groups may be provided within the obtained amphiphilic segmented copolymer or at its ends which open the way for the further polymerization and/or crosslinking to give polymeric products which may advantageously be used for producing ophthalmic devices, especially contact lenses including those suitable for extended periods of wear.

One subject matter of the present invention is thus an amphiphilic segmented copolymer comprising at least one segment A and at least one segment B wherein segment A comprises an oxygen-permeable polymer (hereinafter called "oxyperm polymer"; see definition below) and segment B comprises a water- and ion-permeable polymer (hereinafter called "ionoperm polymer"; see definition below), segments A and B being linked together through a non-hydrolyzable bond, and wherein the copolymer contains at least one polymerizable unsaturated group.

As used in the context of the present description and claims, an "oxyperm polymer" is the polymerization product of a polymerizable material which is capable of polymerizing to form a polymer having a high oxygen permeability. These materials include monomers, oligomers, macromers, and the like, and mixtures thereof, which are capable of polymerizing with like or unlike polymerizable materials to form a polymer which displays a relatively high rate of oxygen diffusion therethrough.

Similarly, an "ionoperm polymer" is a polymerization product of a polymerizable material which is capable of polymerizing to form a polymer having a high ion permeability. These materials include monomers, oligomers, macromers, and the like, and mixtures thereof, which are capable of polymerizing with like or unlike polymerizable materials to form a polymer which displays a relatively high rate of ion or water permeation therethrough.

Another subject matter of the invention is a process for the preparation of a copolymer as defined above comprising the steps of a) providing at least one thermally or photochemically activable cationic or radical initiator group on at least one end or pendent from a compound serving as segment A or segment B in the copolymer;

b) conducting a graft polymerization at the initiator group present on the said segment A or segment B using a monomer from which segment B or segment A, respectively, is derived;

c) optionally changing the monomer and conducting further graft polymerization using a hydrophobic or hydrophilic monomer which is the same or different from the monomer making up segments A and B to produce further hydrophobic segments A' and/or further hydrophilic segments B'; and if a polymerizable final unsaturated group should be provided at the end of the growing segment;

d) reacting the segmented copolymer thus obtained or a suitable derivative therefrom with a functionalized compound carrying a polymerizable unsaturated group.

A further subject matter of the invention is a polymeric product which is obtainable by further polymerizing a copolymer as defined above through the polymerizable unsaturated group(s), optionally in the presence of further vinylic comonomers and optionally of cross-linking agents containing at least 2 unsaturated groups.

Still a further subject matter of the invention is a moulding essentially comprising a polymeric product as defined above.

The moulding is preferably an ophthalmic device for vision correction, especially a contact lens.

A preferred subject matter of the present invention is an ophthalmically compatible, transparent lens suited for extended periods of continuous contact with ocular tissue and tear fluids. A particularly preferred embodiment of the invention is an extended-wear vision correction lens suited for safe and comfortable long term wear without removal.

Still a further subject matter of the invention is the use of an amphiphilic segmented copolymer as defined above for the production of an ophthalmic device for vision correction, especially a contact lens, and the use of said copolymer or of a polymeric product as defined above for coating the surface of an article.

The amphiphilic segmented copolymers are comprised of segments having high oxygen permeability and segments having high ion and water permeability. These segments have as a unique feature in the art a controlled length which is due in the case of the first segment which is used as a substrate for grafting to the fact that commercially available products or separately produced polymers having a defined chain length can be used as starting material, and as regards the growing segment, their chain length is controlled through the amount of monomers added and the conditions of polymerization. According to the invention, amphiphilic segmented copolymers are obtained which can be further processed to materials having a defined microphase separated morphology with two interpenetrating continuous phases, said morphology existing in uncrosslinked films as well as in crosslinked end products, e.g., contact lenses. Through the length of the segments of the hydrophilic and hydrophobic blocks, it is not only possible to adjust the size of the microdomains (<150 nm for optically clear materials), but also the percolating structure of the microphases, including the pathways for gases, water and ions can be controllably adjusted. The polymeric products and the crosslinked end-products (mouldings) obtained from the amphiphilic segmented copolymers of the invention thus exhibit a bicontinuous morphology wherein the oxyperm segments A provide high oxygen permeability through the entire thickness of the moulding (e.g., contact lens) which is essential for appropriate supply of oxygen to the cornea, and the ionoperm segments B provide the high water and ion permeability which is essential for appropriate on-eye mobility of the lens.

In the amphiphilic segmented copolymers of the invention, the hydrophilic and hydrophobic blocks are linked together through covalent, non-hydrolyzable bonds which contribute to the chemical stability of the products. The copolymers have at least one polymerizable unsaturated group and can thus undergo further polymerization, optionally with other vinylic monomers, or crosslinking reaction with crosslinking agents. The copolymers may also have more than one polymerizable unsaturated group and can then undergo efficient direct crosslinking reactions providing fast-curing materials.

The amphiphilic segmented copolymers according to the invention may be used for the production of ophthalmic devices, especially soft contact lenses. Further non-limiting fields of use are biomedical materials and implants, e.g., intraocular lenses, artificial cornea and membranes. They may also be employed outside the field of ophthalmic devices as coatings, e.g., on optical fibers, as technical membranes, in drug delivery systems, as films, sheet materials and moulding for different purposes.

In all fields of use, as mentioned above, the amphiphilic segmented copolymers of the invention and the polymeric products obtained by further polymerization and/or crosslinking therefrom are advantageously used because of their controlled morphology, improved performance profile, high long-term stability, improved reproducibility and low failure rate.

DETAILED DESCRIPTION OF THE INVENTION

1. Amphiohilic segmented copolymers

The amphiphilic segmented copolymer of the invention comprises at least one segment A which comprises an oxyperm polymer as exemplified below, i.e. a polymer displaying a relatively high oxygen diffusion rate therethrough. In addition, these materials are ophthalmically compatible. These oxyperm polymers include, without limitation thereto, polysiloxanes, perfluoroalkyl ethers, specific unsaturated polymers and polysulfones. The oxyperm polymer may also contain hydrophilic groups.

According to one embodiment of the invention, the oxyperm polymer in segment A comprises a polysiloxane block having terminal alkylene groups of Formula (I)

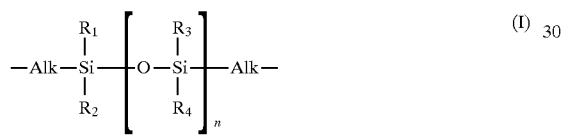

in which n is an integer from 5 to 200; Alk is alkylene having up to 20 carbon atoms; 80–100% of the radicals $R_1$, $R_2$, $R_3$ and $R_4$, independently of one another, are alkyl and 0–20% of the radicals $R_1$, $R_2$, $R_3$ and $R_4$, independently of one another, are alkenyl, aryl, fluoroalkyl or cyanoalkyl.

In a preferred meaning, n is an integer from 5 to 120, particularly preferably 10 to 100, in particular 20 to 80.

In a preferred meaning, 80–100%, preferably 85–100%, in particular 90–100%, of the radicals $R_1$, $R_2$, $R_3$ and $R_4$, are, independently of one another, lower alkyl having up to 8 carbon atoms, particularly preferably lower alkyl having up to 4 carbon atoms, especially lower alkyl having up to 2 carbon atoms. A further particularly preferred meaning of $R_1$, $R_2$, $R_3$ and $R_4$, is methyl.

In a preferred meaning, 0–20%, preferably 0–15%, in particular 0–10%, of the $R_1$, $R_2$, $R_3$ and $R_4$ are, independently of one another, lower alkenyl, unsubstituted or lower alkyl- or lower alkoxy-substituted phenyl, fluoro(lower alkyl), e.g., trifluoropropyl or cyano(lower alkyl).

According to another embodiment of the invention, the oxyperm polymer in segment A comprises a perfluoroalkyl-polyether block of Formula (II)

in which x+y is a number in the range from 10 to 100; each Z, independently of the others, is a divalent radical having up to 12 carbon atoms or a bond; each E, independently of the others, is alkoxy, e.g., —$(OCH_2CH_2)_q$—, where q has a value of from 0 to 2 as a statistical average, and where the link —Z—E— represents the sequence —Z—$(OCH_2CH_2)_q$—; and k is 0 or 1.

Z is preferably a bond, lower alkylene or —CONH-arylene, in which the —CO— moiety is linked to a $CF_2$ group. Z is particularly preferably lower alkylene, in particular methylene.

The perfluoroalkoxy units $OCF_2$ and $OCF_2CF_2$ having the indices x and y in Formula (II) can have a random distribution. The sum of the indices x+y is preferably a number in the range from 10 to 50, particularly preferably from 10 to 30. The ratio x:y is preferably in the range from 0.5 to 1.5, in particular in the range from 0.8 to 1.2.

In a further embodiment of the invention, the oxyperm polymer in segment A comprises an unsaturated polymer comprising repeating units selected from units of formula (III) and (IV)

wherein $R_5$ is hydrogen, alkyl or trialkyl-silyl;

$R_6$ is alkyl, unsubstituted or substituted by alkoxy, alkoxycarbonyl, hydroxy, carboxy, halogen or aryl; alkenyl, unsubstituted or substituted by alkoxy, alkoxycarbonyl, carboxy, halogen or aryl; or alkynyl, unsubstituted or substituted by alkoxy, alkoxycarbonyl, carboxy, halogen or aryl; and $R_7$ and $R_8$, independently of one another, are hydrogen or alkyl; or $R_6$ and $R_7$, taken together, are —$(CH_2)_p$—, wherein p is an integer of 3 to 5, or $R_6$ and $R_7$, taken together, are a divalent residue of Formula

wherein r and s, independently of one another, are an integer of 1 to 3, but do not have at the same time the value 1; or $R_7$ and $R_8$, taken together, are —$(CH_2)_p$—, wherein p is as defined above;

m and o, independently of one another, are an integer of 10 to 100,000; and the sum of m and o is an integer of 20 to 100,010.

An unsaturated polymer containing repeating units of Formula (III) and/or (IV) comprises typically a residue $R_5$, $R_6$, $R_7$ or $R_8$ as terminal group.

The residues $R_5$, $R_6$, $R_7$ and $R_8$ in the units of Formula (III) and/or (IV) are preferably selected in such a way that at least 20% of the units comprise an unsaturated carbon-carbon-bond.

$R_5$ is preferably hydrogen or lower alkyl having up to 8 carbon atoms, more preferably hydrogen or lower alkyl having up to 4 carbon atoms, still more preferably hydrogen or lower alkyl having up to 2 carbon atoms and especially hydrogen or methyl. A further preferred meaning of $R_5$ is tri lower alkyl silyl and especially trimethylsilyl, especially when $R_5$ is linked to a unit of Formula (IV).

$R_6$ is preferably lower alkenyl having up to 8 carbon atoms which is unsubstituted or substituted by lower alkoxy, lower alkoxycarbonyl, carboxy, halogen or phenyl, more preferably lower alkenyl having up to 4 carbon atoms, unsubstituted or substituted by lower alkoxy, lower alkoxycarbonyl, carboxy, halogen or phenyl, and especially lower alkenyl having up to 4 carbon atoms, unsubstituted or substituted by halogen or phenyl.

Alternatively, $R_6$ is preferably lower alkyl having up to 8 carbon atoms, unsubstituted or substituted by lower alkoxy, hydroxy, halogen or phenyl, more preferably lower alkyl having up to 4 carbon atoms, unsubstituted or substituted by lower alkoxy, halogen or phenyl, and especially lower alkyl having up to 4 carbon atoms, unsubstituted or substituted by halogen or phenyl.

$R_7$ is preferably hydrogen or lower alkyl having up to 8 carbon atoms, more preferably hydrogen or lower alkyl having up to 4 carbon atoms, still more preferably hydrogen or lower alkyl having up to 2 carbon atoms and especially hydrogen or methyl.

$R_8$ has independently from $R_7$ the same meaning and preference.

In a preferred embodiment $R_6$ and $R_7$, taken together, are $-(CH_2)_p-$, wherein p is an integer of 3 to 5, preferably 3 or 4, more preferably $R_6$ and $R_7$ are taken together trimethylene.

$R_6$ and $R_7$ in a preferred meaning may also be taken together to form a divalent residue of Formula (V) wherein r is preferably an integer of 1 to 3 and s is preferably 2.

In a preferred embodiment $R_7$ and $R_8$ taken together are $-(CH_2)_p-$, wherein p is an integer of 3 to 5, preferably 3 or 4. $R_3$ and $R_4$ taken together are preferably trimethylene.

A preferred meaning of m and o is independently of one another an integer of 10 to 100,000, more preferably 20 to 10,000 and especially 25 to 1,000. The sum of m and o is preferably an integer of 20 to 100,010, more preferably 20 to 10,000 and especially 25 to 1,000.

A preferred unsaturated polymer is a compound containing repeating units selected from units of Formulae (III) and (IV), wherein $R_5$, $R_7$ and $R_8$ are hydrogen and $R_6$ is lower alkenyl or lower alkenyl substituted by halogen.

A preferred unsaturated polymer is a compound comprising repeating units selected from units of Formulae (III) and (IV), wherein $R_5$, $R_7$ and $R_8$ are hydrogen and $R_6$ is lower alkenyl having up to 4 carbon atoms.

A preferred unsaturated polymer is a compound comprising repeating units of Formula (III), wherein $R_5$, $R_7$ and $R_8$ are hydrogen and $R_6$ is lower alkenyl having up to 4 carbon atoms.

A preferred unsaturated polymer is a compound comprising repeating units of Formula (IV), wherein $R_5$ is tri (lower alkyl)silyl and $R_6$ is lower alkyl.

A preferred unsaturated polymer is a compound comprising alternating repeating units of Formulae (III) and (IV), wherein $R_5$, $R_7$ and $R_8$ are hydrogen and $R_6$ is lower alkyl or lower alkenyl having up to 4 carbon atoms.

An unsaturated polymer is, e.g., a polymer of a conjugated aliphatic or alicyclic diene, which may be substituted by halogen or lower alkyl, a polymer of an alkyne or dialkyne, which may be substituted by lower alkyl or trimethylsilyl, a copolymer of a conjugated diene and a hydrophilic or hydrophobic vinylic monomer, and also partially hydrated derivatives of the mentioned compounds.

Specific examples of preferred polymers of conjugated dienes are cis-, trans-, iso- or syndiotactic poly-1,2-butadiene, poly-1,4-butadiene or polyisoprene, polypentenamer, polychloroprene and polypiperylen. Preferred examples of copolymers are butadiene- or isoprene-copolymers with hydraphilic or hydrophobic vinylic monomers, such as acrylonitrile, styrene, acrylic acid or hydroxyethylmethacrylate. An example of a polyalkyne is poly-1-trimethylsilyl-propyne.

An especially preferred unsaturated polymer is selected from syndiotactic poly-1,2-butadiene, poly-1,4-butadiene and polyisoprene.

An especially preferred unsaturated polymer is poly-1-trimethylsilyl-propyne.

Another especially preferred unsaturated polymer is poly-1,4-butadiene.

In a further embodiment of the invention, the oxyperm polymer in segment A comprises a polysulfone comprising at least one of the structural elements VIa) to VId)

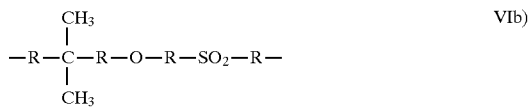

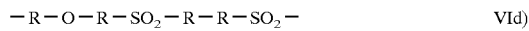

wherein R in structural element VIa) is alkylene or arylene and R in structural elements VIb), VIc) and VId) is arylene, especially phenylene.

In one embodiment of the invention, the oxyperm polymer in segment A may comprise one of the polymers illustrated above. According to another embodiment, the oxyperm polymer in segment A may comprise more than one kind of polymers as illustrated above, e.g., may comprise perfluoroalkylene polyether or polybutadiene subsegments (a) and polysiloxane subsegments (b).

In this case, the number of subsegments (b) in segment A is preferably greater than or equal to the number of subsegments (a).

The ratio between the number of subsegments (a) and (b) in segment A is preferably 3:4, 2:3, 1:2 or 1:1.

The molar ratio between the number of subsegments (a) and (b) in segment A is more preferably 2:3, 1:2 or 1:1.

The mean molecular weight of segment A comprising subsegments as explained above is in the range from about 1,000 to about 50,000, preferably in the range from about 3,000 to about 15,000, particularly preferably in the range from about 5,000 to about 12,000.

The total number of subsegments (a) and (b) in segment A is preferably in the range from 2 to about 11, particularly preferably in the range from 2 to about 9, and in particular in the range from 2 to about 7. The smallest segment A is preferably composed of one perfluoro subsegment (a) and/or one siloxane subsegment (b).

In a preferred embodiment of segment A which preferably has a composition in the above-mentioned ratios, segment A is terminated at each end by a siloxane segment (b).

Said compositions in a bivalent segment A always correspond above and below to a mean statistical composition. This means that, for example, even individual block copolymer radicals containing identical recurring units are included, so long as the final mean statistical composition is as specified.

In addition to the at least one segment A comprising an oxyperm polymer, the amphiphilic segmented copolymer of the invention comprises at least one segment B which comprises an ionoperm polymer as exemplified below, i.e. a polymer displaying a relatively high ion diffusion rate therethrough. In addition, these materials must be ophthalmically compatible.

Segment B is made up of hydrophilic monomers which are linked to segment A by a non-hydrolyzable bond. Specific examples of hydrophilic monomers which are suitable for segment B are cyclic imino ethers, vinyl ethers, cyclic ethers including epoxides, cyclic unsaturated ethers, N-substituted aziridines, β-lactones and β-lactames. Further suitable monomers include keten acetales, vinyl acetales and phosphoranes.

The cyclic imino ethers which may be used as hydrophilic monomers to build up segment B are cyclic imino ether compounds of Formula (VII)

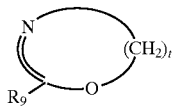 (VII)

wherein $R_9$ represents a hydrogen atom, an alkyl, hydroxyalkyl or alkenyl group having up to 22 carbon atoms and optionally containing ether, ester or urethane groups, a cycloalkyl group, an aralkyl group or an aryl group; and t is 2 or 3.

Specific examples of suitable and preferred cyclic imino ethers are 2-oxazolines of Formula (VII) wherein $R_9$ is an alkyl or alkenyl group or a hydroxyalkyl group having up to 10, more preferably up to 4 carbon atoms. Also preferred are their 2-isocyanatoethyl methacyrate adducts on the hydroxyalkyl group. If a 2-oxazoline having an alkenyl group in 2 position is used as hydrophilic monomer, a polymerizable unsaturated group is provided within segment B (in a side chain) of the amphiphilic segmented copolymer which may serve as the polymerizable unsaturated group necessary for the final polymerization to obtain a polymeric product suitable to prepare a moulding, such as a contact lens, or as an additional polymerizable unsaturated group which offers the possibility of direct crosslinking in the preparation of the moulding.

The most preferred cyclic imino ether to be used for preparing segment B is 2-methyloxazoline.

Other compounds which are preferred for use as hydrophilic monomers in the production of segment B are vinyl ethers of Formula (VIII)

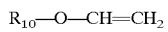 (VIII)

wherein $R_{10}$ is alkyl or alkoxyalkyl having 1 to 10 carbon atoms, dioxolane, dioxetanes or cyclic ethers of Formulae (IX), (X) or (XI)

 (IX)

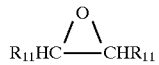 (X)

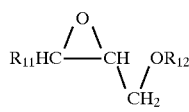 (XI)

wherein u is an integer of 3 to 5, each $R_{11}$ is independently hydrogen or an alkyl or alkenyl group having up to 22 carbon atoms and optionally containing ether, ester or urethane groups, a cycloalkyl group, an aralkyl group or an aryl group and $R_{12}$ is an alkyl, alkenyl or alkoxyalkyl group having up to 4 carbon atoms.

The most preferred vinyl ethers are methyl vinyl ether, ethyl vinyl ether and methoxy ethyl vinyl ether.

The preferred cyclic ethers are epoxides of Formula (X) wherein one $R_{11}$ is hydrogen and the other is hydrogen or alkyl having 1 to 4 carbon atoms, especially ethyleneoxide, propyleneoxide and butyleneoxide. Also preferred are the hydrophilic glycidyl ethers of Formula (XI) wherein $R_{11}$ is hydrogen and $R_{12}$ is methyl, vinyl, allyl or ethoxyethyl.

In the amphiphilic segmented copolymer of the invention, segments A and B are linked together through a non-hydrolyzable bond. A "non-hydrolyzable bond" in the sense in which this term is used in the context of the invention is a covalent bond which is not cleaved by an ordinary aqueous or solvent hydrolysis reaction, e.g., under acidic or basic conditions. "Non-hydrolyzable" in this sense are, e.g.,

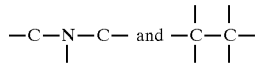

bonds. Specific examples of bonds which are hydrolyzable within the meaning of the term as explained above are ester, amide and urethane bonds.

2. Preparation of the Amphiphilic Segmented Copolymers

The non-hydrolyzable bond between segments A and B in the amphiphilic segmented copolymer of the invention is formed in accordance with the invention by polymerizing a suitable hydrophilic monomer (which provides segment B) in the presence of a suitably functionalized segment A such that a block of units of the hydrophilic monomer grows from the site of functionalization of segment A or, alternatively by polymerizing a suitable hydrophobic monomer (which provides segment A) in the presence of a suitably functionalized segment B such that a block of units of the hydrophobic monomer grows from the site of functionalization of segment B.

The functionalized segment is also called "macroinitiator" within the context of this specification. It is a polymeric compound comprising an oxyperm or ionoperm polymer as specified above which carries terminal and/or pendant initiator groups I as represented in the following schematic formulae for a functionalized oxyperm segment A

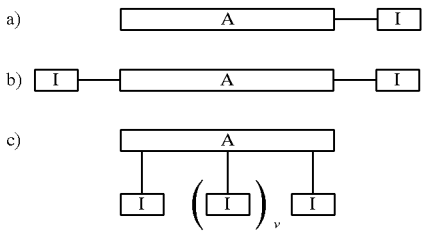

wherein A stands for segment A, I designates an initiator group and v is 0 to 20.

The initiator group I may be a thermally or photochemically activable cationic or a thermally or photochemically activable radical initiator group. Specific examples of the preferred photochemically activable cationic initiator groups are triflate ($—O—SO_2—CF_3$), -J, O-mesyl, -O-tosyl, and $-Cl+AgSbF_6$. The most preferred initiator group is the triflate group.

The initiator group is linked to the segment, on which it is provided (segment A in the schematic formulae above) in a way which provides a covalent non-hydrolyzable bond between the terminal group of the said segment and the first monomer forming the growing segment (segment B in the schematic formulae hereinbelow) which is attached to the starting segment during the graft copolymerization for preparing the amphiphilic segmented copolymer. Grafting means that onto a preformed polymer, other polymer chains are grown from a monomer either in terminal or in pendant position.

The initiator group I may be introduced into a preformed polymer in a suitable way, for example through linkage of cationic or thermal initiator groups to functional groups present on the starting segment. Only the latter method is suitable for providing pendent initiator groups (see c) in the above schematic formulae) Preferred triflate groups can for example be introduced by reaction of terminal or pendent functional hydroxyl groups with activated triflic acid derivatives such as $(CF_3SO)_2O$.

Graft polymerization of a suitable hydrophilic monomer in the presence of a functionalized segment A as shown above provides amphiphilic segmented copolymers which may schematically be represented by the formulae:

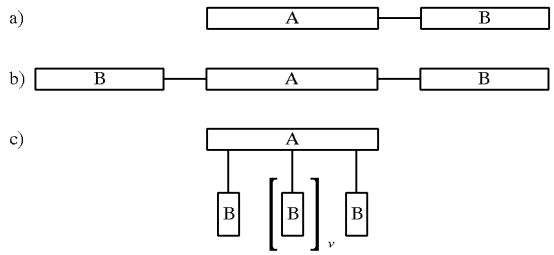

The amphiphilic segmented copolymers of the invention may thus consist in one embodiment of one segment A and one segment B only (A-B-type; diblock) or of one segment A and two segments B attached to its termini (B-A-B-type; triblock) or may have a comb-type structure wherein several segments B are pendent from one segment A (which of course may further carry one or two terminal segments B which are not shown in schematic formula c), above).

In another embodiment the amphiphilic segmented copolymers of the invention may consist of one segment B and two segments A attached to its termini (A-B-A-type; triblock) or may have a comb-type structure wherein several segments A are pendent from one segment B (which of course may further carry one or two terminal segments A.

It is also possible to change the monomer during graft copolymerization such that for example first hydrophilic segments B are grown on a preformed hydrophobic segment A and then by using a hydrophobic monomer hydrophobic segments A' are attached to the termini of the earlier prepared segments B. Also a different hydrophilic monomer may be used to produce a different hydrophilic segment B' at the termini of the hydrophilic segments B. Again, other embodiments of the amphiphilic segmented copolymers of the invention may be produced starting from a functionalized hydrophilic segment B. In this specification, segments A and A' as well as B and B' are sometimes simply called "segments A" and "segments B", respectively.

The polymer which makes up the starting segment A usually has a number average molecular weight $M_n$ of 500 to 25000, preferably 800 to 15000 and more preferably 1000 to 8000. The length of the one or more segments B, A' or B' which are to be graft copolymerized on the starting segment can be easily controlled by controlling the amount of monomer (hydrophilic or hydrophobic) which is added for the graft copolymerization. In this way the size of the segments and their ratio can easily be controlled.

The segmented copolymers obtained by grafting suitable hydrophilic or hydrophobic monomers onto a starting segment may already contain polymerizable unsaturated groups in the hydrophobic and/or hydrophilic segments, e.g., if a hydrophobic segment A comprises a dienpolymer like polybutadiene or polyisoprene, or if the monomer used for making a hydrophilic segment comprises an unsaturated side chain, for example 2-allyl-oxazoline. If no polymerizable unsaturated groups are present or also if such groups are present, it is possible to introduce polymerizable unsaturated groups by suitable reactions, e.g. at the end of or also pendent from the growing segments. For this purpose, the graft polymerization of the growing segment may be terminated after a suitable chain length is reached and the initiator group present at the chain end is capped for example either by using specific reagents such as hydroxy styrene, allyl alcohol, HEMA, propargyl alcohol, allyl amines and propargyl amine, or by using KOH/EtOH or primary amines leaving OH or —NH— groups or unsaturated groups at the end of the growing segment. Hydroxyl groups may also be introduced into the copolymers by employing suitable comonomers in the graft copolymerization, e.g., 2-hydroxy-alkyloxazolines. The hydroxyl or NH— groups may then be reacted, e.g., with an isocyanate carrying a polymerizable unsaturated group. Preferred examples of such bifunctional compounds are 2-isocyanatoethyl methacrylate (IEM) which is especially preferred, and vinyl isocyanate, allyl isocyanate, acryloyl isocyanate, styrene isocyanate, vinyl benzyl isocyanate, propargyl isocyanate and (meth)acrylic anhydride.

In this way, as shown for a specific embodiment in the following reaction scheme, an amphiphilic segmented copolymer of the invention in which oxyperm segment A and ionoperm segment B are linked together through a non-hydrolyzable bond and wherein the copolymer contains at least one polymerizable unsaturated group can be obtained.

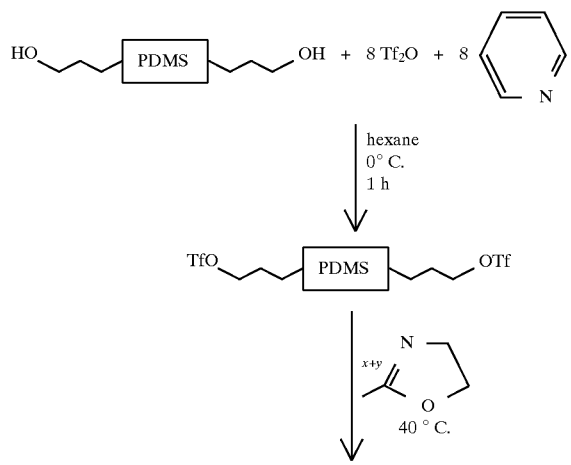

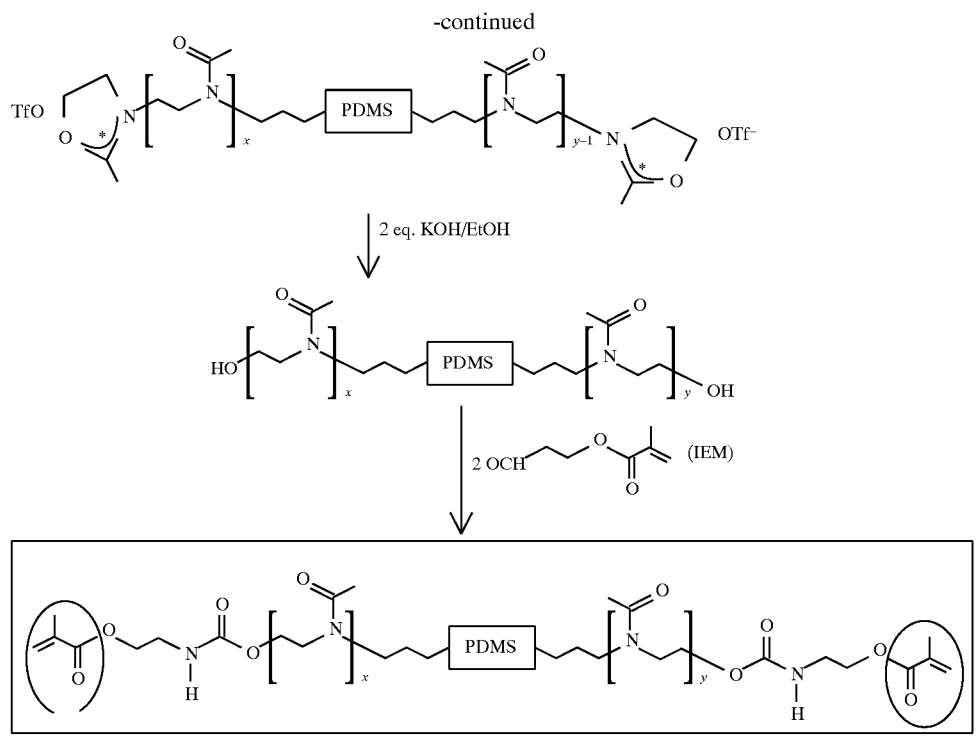

PDMS: Polydimethylsiloxane
Tf: Trofluoromethylsulfonyl
IEM: 2-Isocyanatoethyl methacrylate The amphiphilic segmented copolymers of the invention can be prepared in the presence or absence of a solvent. It is advantageous to use a substantially inert solvent, i.e. one which does not participate in the reaction. Suitable examples thereof are halogenated hydrocarbons, such as chloroform or methylene chloride, bipolar aprotic solvents, such as acetonitrile, acetone, dimethylformamide (DMF) or dimethyl sulfoxide (DMSO), hydrocarbons, such as toluene or xylene, and furthermore pyridine or N-methylmorpholine. Depending on the solubility properties of segments A and of the comonomers forming segments B, the use of mixtures of solvents can be of particular advantage.

In the preparation of the amphiphilic segmented copolymers of the invention, the reaction temperature can be, for example, from −60° C. to 150° C., preferably from 0° C. to 80° C. The reaction times are in the range from about 15 minutes to 7 days, preferably in the region of about 2 to 48 hours. If necessary, the reaction is carried out under argon or nitrogen as protective gas.

In the urethane-forming terminal functionalizing reaction, a suitable catalyst, for example dibutyltin dilaurate (DBTDL), is advantageously added.

3. Polymeric Products

The present invention furthermore relates to a polymeric product obtainable by further polymerization and/or crosslinking of at least one amphiphilic segmented copolymer as defined above and, if desired, at least one vinylic comonomer (a).

In the preferred polymeric product, the proportion by weight of an amphiphilic segmented copolymer is in the range from 100 to 50%, in particular in the range from 100 to 80%, preferably in the range from 100 to 90%, based on the total polymeric product.

The polymeric product may be obtained by direct further thermal or photochemical polymerization or crosslinking reaction of the amphiphilic segmented copolymer without the addition of comonomers in the presence of a suitable initiator.

Alternatively, crosslinking may be achieved with the addition of a comonomer (a) and/or a crosslinking agent, for example, a polyunsaturated comonomer (b). Also mixtures of diblock, triblock, and/or comb-type copolymers as illustrat-ed above may be further polymerized and crosslinked.

In a preferred polymeric product, comonomer (a) is absent and the product is a polymeric network composed exclusively of the amphiphilic segmented copolymer.

A comonomer (a) present in the polymeric product can be hydrophilic or hydrophobic or a mixture thereof. Suitable comonomers are, in particular, those which are usually used in the production of contact lenses and biomedical materials.

A hydrophobic comonomer (a) is taken to mean a monomer which typically gives a homopolymer which is insoluble in water and can absorb less than 10% by weight of water.

Analogously, a hydrophilic comonomer (a) is taken to mean a monomer which typically gives a homopolymer which is soluble in water or can absorb at least 10% by weight of water.

Suitable hydrophobic comonomers (a) are, without this being an exhaustive list, $C_1$–$C_{18}$alkyl and $C_3$–$C_{18}$cycloalkyl acryl-ates and methacrylates, $C_3$–$C_{18}$alkylacrylamides and -methacrylamides, acrylonitrile, methacrylonitrile, vinyl $C_1$–$C_{18}$ alkanoates, $C_2$–$C_{18}$alkenes, $C_2$–$C_{18}$haloalkenes, styrene, (low-er alkyl)styrene, $C_4$–$C_{12}$alkyl vinyl ethers, $C_2$–$C_{10}$perfluoro-alkyl acrylates and methacrylates and correspondingly par-tially fluorinated acrylates and methacrylates, $C_3$–$C_{12}$perfluoroalkylethylthiocarbonylaminoethyl acrylates and methacrylates, acryloxy- and methacryloxyalkylsiloxanes, N-vinylcarbazole, $C_1$–$C_{12}$alkyl esters of maleic acid, fumaric acid, itaconic acid, mesaconic acid and the like. Preference is given, for example, to acrylonitrile, $C_1$–$C_4$alkyl esters as well as perfluoroalkyl and siloxanylalkyl esters of vinylically unsaturated carboxylic acids having 3 to 5 carbon atoms or vinyl esters of carboxylic acids having up to 5 carbon atoms.

Examples of suitable hydrophobic comonomers (a) are methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, butyl acrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tristrimethylsilyloxysilylpropyl methacrylate (TRIS) and 3-methacryloxypropylpentamethyldisiloxane.

Preferred examples of hydrophobic comonomers (a) are methyl methacrylate, TRIS and acrylonitrile.

Suitable hydrophilic comonomers (a) are, without this being an exhaustive list, hydroxyl-substituted lower alkyl acryl-ates and methacrylates, acrylamide, methacrylamide, (lower alkyl)acrylamides and -methacrylamides, N,N-dialkyl-acrylamides, ethoxylated acrylates and methacrylates, polyethyleneglycol-mono (meth) acrylates and polyethyleneglycolmonomethylether- (meth)acrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl) acrylates and methacrylates, allyl alcohol and the like. Preference is given, for example, to N-vinyl-2-pyrrolidone, acrylamide, methacrylamide, hydroxyl-substitut-ed lower alkyl acrylates and methacrylates, hydroxy-substituted (lower alkyl)acrylamides and -methacrylamides and vinylically unsaturated carboxylic acids having a total of 3 to 5 carbon atoms.

Examples of suitable hydrophilic comonomers (a) are hydroxyethyl methacrylate (HEMA), hydroxyethyl acrylate, hydroxypropyl acrylate, 3-trimethylammonium 2-hydroxypropylmethacrylate chloride (Blemer,QA, for example from Nippon Oil), dimethylaminoethyl methacrylate (DMAEMA), dimethylaminoethylmethacrylamide, acrylamide, methacrylamide, N,N-dimethylacrylamide (DMA), allyl alcohol, vinylpyridine, glycerol methacrylate, N-(1,1-dimethyl-3-oxobutyl)acrylamide, N-vinyl-2-pyrrolidone (NVP), acrylic acid, methacrylic acid and the like.

Preferred hydrophilic comonomers (a) are 2-hydroxyethyl methacrylate, dimethylaminoethyl methacrylate, trimethylammonium 2-hydroxypropylmethacrylate chloride, N,N-dimethylacrylamide and N-vinyl-2-pyrrolidone.

A polymer network can, if desired, be reinforced by addition of a crosslinking agent, for example a polyunsaturated comonomer (b). In this case, the term crosslinked polymers is used. The invention therefore furthermore relates to a crosslinked polymeric product comprising the product of the polymerization and crosslinking reaction of an amphiphilic segmented copolymer, if desired with at least one vinylic comonomer (a) and with at least one crosslinking agent (b).

Examples of suitable crosslinking agents (b) include allyl (meth)acrylate, lower alkylene glycol di(meth)acrylate, poly (lower alkylene) glycol di(meth)acrylate, lower alkylene di(meth)acrylate, divinyl ether, divinyl sulfone, di- and trivinylbenzene, trimethylolpropane tri(meth)acrylate, pentaerythritol tetra(meth)acrylate, bisphenol A di(meth) acrylate, methylenebis(meth)acrylamide, triallyl phthalate and diallylphthalate, α,ω-bis (methacryloxyalkyl) -oligosiloxanes such as bis(methacryloxypropyl) tetramethyldisiloxane and perfluoroalkyl- or perfluoroalkylether-bis(meth)acrylates.

The amount of crosslinking agent (b) used is expressed in a proportion by weight based on the total polymer and is in the range from 20 to 0.05%, in particular in the range from 10 to 0.1%, preferably in the range from 5 to 0.1%.

The polymeric products are synthesized in a manner known in the art from the corresponding monomers (the term monomer here also including an amphiphilic segmented copolymer) by a polymerization reaction customary to the person skilled in the art. Usually, a mixture of the above-mentioned monomers is warmed with addition of a free-radical former. Examples of such free-radical formers are azoisobutyronitrile (AIBN), potassium peroxodisulfate, dibenzoyl peroxide, hydrogen peroxide and sodium percarbonate. If, for example, said compounds are warmed, free radicals form with homolysis, and can then initiate, for example, a polymerization.

A polymerization reaction can particularly preferably be carried out using a photoinitiator. In this case, the term photopolymerization is used. In the photopolymerization, it is appropriate to add a photoinitiator which can initiate free-radical polymerization and/or crosslinking by using light. Examples thereof are customary to the person skilled in the art; suitable photoinitiators are, in particular, benzoin methyl ether, 1-hydroxycyclohexylphenyl ketone, Darocure and Irgacure products, preferably Darocure 1173® and Irgacure 2959®. Also suitable are reactive photoinitiators, which can be incorporated, for example, into a macromer, or can be used as a specific comonomer (a). Examples thereof are given in EP 0 632 329. The photopolymerization can then be initiated by actinic radiation, for example light, in particular UV light having a suitable wavelength. The spectral requirements can, if necessary, be controlled appropriately by addition of suitable photosensitizers.

A polymerization can be carried out in the presence or absence of a solvent. Suitable solvents are in principle all solvents which dissolve the monomers used, for example water, alcohols, such as lower alkanols, for example ethanol or methanol, furthermore carboxamides, such as dimethylformamide, dipolar aprotic solvents, such as dimethyl sulfoxide or methyl ethyl ketone, ketones, for example acetone or cyclohexanone, hydrocarbons, for example toluene, ethers, for example THF, dimethoxyethane or dioxane, halogenated hydrocarbons, for example trichloroethane, and also mixtures of suitable solvents, for example mixtures of water and an alcohol, for example a water/ethanol or water/methanol mixture.

4. Final Products

The polymeric products or crosslinked polymeric products can be prepared as mouldings in a manner known per se, in particular into contact lenses, for example by carrying out the photopolymerization or photocrosslinking of the polymeric product in a suitable contact-lens mould. The invention therefore furthermore relates to mouldings essentially comprising the novel polymeric products or crosslinked polymeric products. Further examples of mouldings, in addition to contact lenses, are biomedical articles or in particular ophthalmic mouldings, for example artificial corneas, intraocular lenses, eye bandages, mouldings used in surgery, such as heart valves and artificial arteries, furthermore coatings, films or membranes, for example membranes for diffusion control, photostructurable films for information storage, or photoresist materials, for example membranes or mouldings for etch resists or screen printing resists, furthermore particles, in particular microparticles, capsules, in particular microcapsules, films and plasters for drug delivery systems.

A specific embodiment of the invention is directed to contact lenses which essentially comprise or consist of the polymeric product or crosslinked polymeric product comprising the amphiphilic segmented copolymer of the invention. Such contact lenses have a range of unusual and extremely advantageous properties. Amongst these properties are, for example, their excellent compatibility with the human cornea (if necessary after suitable surface treatment (coating)) and with tear fluid, which is based on a balanced ratio between water content, oxygen permeability and mechanical and adsorptive properties. This results in high comfort and the absence of irritation and allergenic effects. Owing to their favourable permeability properties with respect to various salts, nutrients, water and diverse other components of tear fluid and gases ($CO_2$ and $O_2$), the contact lenses of the invention have no effect, or virtually no effect, on the natural metabolic processes in the cornea. In contrast to many other siloxane- or perfluoroalkyl-containing contact lenses, lenses which contain the amphiphilic segmented copolymer of the invention as essential constituent do not have the undesired suction cup effect. Furthermore, the contact lenses have high dimensional stability and shelf life.

The present invention furthermore relates to contact lenses essentially comprising one of the polymeric products or crosslinked polymeric products of the invention, these being water containing soft contact lenses and ophthalmic implants.

The invention furthermore relates to contact lenses essentially comprising one of the polymeric products or crosslinked polymeric products of the invention, these being low-water-content, flexible, gas-permeable (RGP) contact lenses and ophthalmic implants.

All the above-mentioned advantages apply not only to contact lenses, but also to other mouldings of the invention.

The present invention furthermore relates to the use of a novel macromer of the formula above or of a polymeric product or crosslinked polymeric product prepared therefrom and described above, for the coating of a substrate, for example glass, ceramic or metal, and preferably of polymer substrates, for example ophthalmically usable products such as contact lenses, intraocular lenses or eye bandages, and of medically usable products, for example in surgical or pharmaceutical systems, preference being given in the latter cases (ophthalmic uses) to hydrophilic coatings.

The polymeric products are also suitable for use as corneal implants or artificial corneas and furthermore as cell-growth substrates, as materials for fixing and cultivating animal cells in vitro and in vivo, as medical implants, for example implantable semipermeable membrane materials, as artificial discs, as tissue implants for cosmetic surgery, as materials for cartilage repair and replacement, as implants containing hormone-releasing cells, for example islet of Langerhans cells, as breast implants or as artificial joints.

The invention therefore furthermore relates to a corneal implant produced from a polymeric product as described above. A corneal implant of this type can be produced using the same process as described above for the production of contact lenses. Corneal implants can be implanted using conventional surgical methods, for example under, in or through the epithelial tissue of the cornea or into the stroma of the cornea or into other tissue layers of the cornea. Such implants can modify the optical properties of the cornea, for example in the sense of correcting a visual defect and/or by modifying the appearance of the eye, for example the pupillary coloration. A corneal implant can cover the area over the optical axis which covers the pupil on implantation and provides the ability to see, and furthermore the area surrounding the periphery of the optical axis. The implant can have the same visual properties over the entire area.

It has been found that the flow of high-molecular-weight components of tissue fluid, for example proteins or glycoproteins, e.g. growth factors, peptides, hormones or proteins which are responsible for transport of essential metal ions through the corneal implant, in particular between epithelial cells and stroma cells and even behind the endothelium is important both for survival of tissue and for the ability of tissue to live outside and inside a corneal implant. A corneal implant is therefore preferably produced with a porosity sufficient to allow solutes contained in physiological fluids having a molecular weight of >10,000 daltons to pass through, where flow of components of tissue fluid is ensured in addition to flow of low-molecular-weight nutrient components, for example glucose, lipids or amino acids or breathing gases between cells on both sides of an implant.

The porosity of a corneal implant is either given by the polymer material from which it is produced or pores can additionally be introduced into a novel polymer by one of the numerous known processes, which are described, for example, in WO 90/07 575, WO 91/07 687, U.S. Pat. No. 5,244,799, U.S. Pat. No. 5,238,613, U.S. Pat. No. 4,799,931 and U.S. Pat. No. 5,213,721.

Irrespective of which method is used to form the requisite porosity of a novel implant, an implant preferably has a porosity sufficient to allow proteins and other biological macromolecules having a molecular weight of up to or greater than 10,000 daltons to pass through, for example a molecular weight of 10,000–1,000,000 daltons, but not so large that entire cells can pass through and penetrate into the area over the optical axis of the implant. Where the porosity of the implant is established by pores, the area over the optical axis contains a multiplicity of pores, whose number is not restricted, but should be sufficient to enable free flow of tissue components between the outer and inner region of an implant. The pores over the area of the optical axis preferably do not cause scattering of visible light to an extent which would cause problems with respect to visual correction. The term pore used above and below is taken to mean a pore which has no geometrical restrictions and has either a regular or irregular morphology. The statement of a pore size does not mean that all the pores have the same diameter, but should be taken as a mean diameter.

In the area outside the optical axis, the corneal implant can have the same porosity as in the area over the optical axis. This peripheral area of an implant, which surrounds the area of the optical axis, is also referred to as the skirt. In contrast to the region of the optical axis, it can allow corneal cells to grow in, anchoring the implant on the eye.

The porosity in the skirt can also be an independent feature of the material from which the skirt is produced. If the skirt is made from the same material as the material over the optical axis, pores having different diameters can be introduced on the one hand in the skirt and on the other hand over the optical axis. On the other hand, the skirt can be produced from another material than the material over the optical axis, in which case, as stated above, the porosity in the skirt should be greater than that over the optical axis. The skirt preferably comprises an optically clear polymer like one over the optical axis; however, the skirt can also comprise a material which is not optically clear or be produced from a porous material which is not optically clear.

The polymeric product or crosslinked polymeric product of the invention can support colonization with tissue cells, for example vascular endothelial cells, fibroblasts or cells formed in bones; it is not necessary for a specific surface nature to be present to stimulate cell adhesion and cell growth. This is advantageous, since the process costs can be kept low. On the other hand, the polymeric product can be surface-modified by known methods, for example plasma treatment of a surface by glow discharge, as described, for example, in U.S. Pat. No. 4,919,659 and WO 89/00220, or by irradiation, by chemical treatment or by photochemical surface grafting.

The polymeric product or crosslinked polymeric product of the invention can be coated on its surface with one or more components in order, for example, to promote growth of tissue. Examples of such materials are fibronectin, chondroitin sulfate, collagen, laminin, cell attachment proteins, cold insoluble globulin, chondronectin, epidermal growth factors, muscle fibre proteins, and/or derivatives, active fragments and mixtures thereof. Fibronectin, epidermal growth factors and/or derivatives, active fragments and mixtures thereof are particularly useful. A surface coating of this type can, if necessary, also be carried out after a surface modification as described above. A novel polymer can advantageously combine a plurality of said properties, for example the attachment of cells with good biostability and resistance to deposits.

The mechanical properties of the polymeric product or crosslinked polymeric product of the invention are suitable for use as a corneal implant, the material preferably having a modulus of 0.5–10 MPa. A modulus in said range gives a corneal implant a suitable flexibility to enable insertion into the eye, for example over the region of the Bowman membrane.

The polymeric product or crosslinked polymeric product of the invention can furthermore be used as a cell-growth substrate, for example as cell-culture equipment, for example utensils, bottles dishes and the like, furthermore in biological reactors, for example in the production of valuable proteins and other cell-culture components.

5. Extended Wear Contact Lenses

In an important aspect, the present invention refers to contact lenses comprising an amphiphilic segmented copolymer of the invention which—because of the outstanding pro-perties of the copolymers including high oxygen transmissi-bility, good movement on the eye and high permeability for ions and water—may be used for extended periods of wear, e.g., up to 30 days.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer" is defined as:

[(cm³ oxygen)(mm)/(cm²)(sec)(mm Hg)]×10⁻⁹

The "oxygen permeability", Dk, of a lens material does not depend on lens thickness. Oxygen permeability is the rate at which oxygen will pass through a material. Oxygen perme-ability is conventionally expressed in units of barrers, where "barrer" is defined as:

[(cm³ oxygen)(mm)/(cm²)(sec)(mm Hg)]×10⁻¹⁰

These are the units commonly used in the art. Thus, in order to be consistent with the use in the art, the unit "barrer" will have the meanings as defined above. For example, a lens having a Dk of 90 barrers ("oxygen permeability barrer") and a thickness of 90 microns (0.090 mm) would have a Dk/t of 100 barrers/mm ("oxygen transmissibility barrers"/mm).

The oxygen transmissibility of the extended-wear lens from the outer surface to the inner surface must be sufficient to prevent any substantial corneal swelling during the period of extended wear. It is known that the cornea swells approximately 3% to 4% during overnight periods of sleep when the eyelids are closed, as a result of oxygen deprivation. It is also known that wearing a conventional contact lens for a period of about 8 hours (overnight wear) causes corneal swelling of about 11%. However an acceptable extended-wear contact lens will produce, after wear of about 24 hours, including normal sleep periods, corneal swelling of less than about 8%, more preferably less than about 6%, and most preferably less than about 4%. A preferred extended-wear contact lens will produce, after wear of about 7 days, including normal sleep periods, corneal swelling of less than about 10%, more preferably, less than about 7%, and most preferably less than about 5%. Thus, the extended-wear lens must have oxyperm polymer in an amount sufficient to produce oxygen diffusion to yield the above properties relating to corneal swelling. Preferably, the extended-wear lens has a continuous phase of oxyperm polymer extending from the outer surface to the inner surface of the lens.

The oxygen permeability of a lens and oxygen transmissibility of a lens material may be determined by the following technique. Oxygen fluxes (J) are measured at 34 C in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm³/min., while a nitrogen stream is passed on the opposite side of the lens at a rate of about 10 to 20 cm³/min. The barometric pressure surrounding the system, $P_{measured}$, is measured. The thickness (t) of the lens in the area being exposed for testing is determined by measuring about 10 location with a Mitotoya micrometer VL-50, or similar instrument, and averaging the measurements. The oxygen concentration in the nitrogen stream (i.e., oxygen which diffuses through the lens) is measured using the DK1000 instrument. The oxygen permeability of the lens material, $D_k$, is determined from the following formula:

$$D_k = Jt(P_{oxygen})$$

where

J=oxygen flux [microliters O₂/cm²-minute]

$P_{oxygen} = (P_{measured} - P_{water\ vapor}) \times (\%O2$ in air stream) [mm Hg]=partial pressure of oxygen in the air stream $P_{measured}$=barometric pressure [mm Hg]

$P_{water\ vapor}$=0 mm Hg at 34° C. (in a dry cell) [mm Hg]

$P_{water\ vapor}$=40 mm Hg at 34° C. (in a wet cell) [mm Hg]t=average thickness of the lens over the exposed test area [mm]

where Dk is expressed in units of barrers, i.e., [(cc oxygen)(mm)/cm²]×[sec/mm Hg]×10⁻¹⁰.

The oxygen transmissibility ($D_k/t$) of the material may be calculated by dividing the oxygen permeability ($D_k$) by the average thickness (t) of the lens.

The oxygen transmissibility (Dk/t) of the extended-wear lens of the invention is preferably at least 70 barrers/mm, more preferably at least 75 barrer/mm, and most preferably at least 87 barrers/mm. The lens center thickness is typically more than about 30 microns, preferably about 30 to about 200 microns, more preferably about 40 to about 150 microns, even more preferably about 50 to about 120 microns, and most preferably about 60 to 100 microns.

Morphology

One requirement of the lens material is that the lens allows a high visible light transmission from the outer to inner surface of the lens. A lens morphology which includes large phase separated regions will reduce visible light transmission and cause substantial undesirable image distortion, thereby destroying the value of the lens as a vision correction device. Thus, the lens must have a morphology which allows at least about 80%, more preferably about 90%, visible light transmission and does not produce any significant undesirable image distortion.

The lens material has at least two phases: the phases including at least one oxyperm phase and at least one ionoperm phase. While there may be two distinct phases, it is believed that there may be a transition phase, or interphase, in which the material composition and the material properties are a blend of those of the oxyperm and ionoperm materials. Thus, there may exist a distinct oxyperm phase or a plurality of distinct oxyperm phases, a distinct ionoperm phase or a plurality of distinct ionoperm phases, and an amphiphatic phase mixture or blend of oxyperm and ionoperm phases. In one preferred embodiment, the glass transition temperature (Tg) of the oxyperm phase is less than about −115° Celsius.

The existence of separate oxyperm and ionoperm phases, rather than a complete blend of oxyperm and ionoperm phases, is believed to be advantageous in promoting the diffusion of oxygen and ions. Oxygen will diffuse predominantly through the oxyperm polymer, while the ionoperm polymer provides a higher barrier to oxygen diffusion. Similarly, ions will diffuse well through the ionoperm polymer, but the oxyperm polymer provides a higher resistance to ion diffusion. Thus, one homogeneous oxyperm/ionoperm phase will provide undesirable resistance to both oxygen and ion diffusion, while two separate oxyperm and ionoperm phases will provide low resistance pathways for transmission of both oxygen and ions or water. Thus, the ideal extended wear lens has a pathway or series of pathways from the outer surface to the inner surface for transmission of oxygen therethrough, and an analogous continuous pathway or series of pathways for transmission of oxygen therethrough, and an analogous continuous pathway or series of pathways for transmission of water or ions therethrough. In a particularly preferred embodiment, the lens has two co-continuous phases, one an oxyperm phase and the other an ionoperm phase, allowing for permeation of water or ions and oxygen between the front and base curves of the lens.

Bulk Water Content

The measurement of water content is difficult because the removal of adhered surface droplets, without affecting the bulk lens water content, is difficult. In addition, water may evaporate from the lens surface quickly, thereby lowering the water content from the equilibrium level. Accordingly, a discussion of the bulk water content of a lens warrants a discussion of the measurement technique used to determine the water content.

The preferred bulk water content of the hydrated lens will be a function of the lens material properties. The material properties are dependent on the prepolymerization macromers and monomers and polymerization conditions. Thus, the preferred water content for a lens including a fluorine-containing oxyperm material may be different from that of a lens including a siloxane-containing oxyperm material. Accordingly, while general ranges for bulk water content are offered for a better understanding of the invention, the invention is not generally limited to specific bulk water contents.

One method of measuring the water content of a lens formed in accordance with the present invention, referred to herein as the "Bulk Technique", is as follows. First the lens is thoroughly hydrated in a physiological saline solution, such that the water in the lens is in equilibrium with the surrounding water. Next the lens is gently blotted between two lint-free blotting cloths to remove surface moisture. The lens is quickly placed on an aluminium weighing pan and the first wet weight, $W_1$, is measured. Next, the aluminium pan with lens is placed in an oven at 36° C. for a period of at least 24 hours. After heat treating, the pan with lens is removed, placed in a desiccator, and allowed to cool to room temperature (about 22° C.). The pan with lens is weighed again to determine the dry weight, $W_d$. The lens is re-equilibrated in physiological saline solution and a second wet weight $W_2$ is determined thereon. The wet weighs ($W_1$ and $W_2$ are averaged to yield an average wet weight, $W_w$. The bulk water content is determined by the following equation:

$$\text{Percent water content} = (W_w - W_d)/W_w \times 100$$

A preferred lens bulk water content, determined by the "Bulk Technique", is less than about 30 weight percent. More preferably, the lens has a water content of about 5 to 30 weight percent, based on the total lens weight. A particularly preferred lens water content is about 10 to about 20 weight percent, especially about 10 to 15 weight percent. The relatively low water content is a distinct advantage because it permits higher oxygen transmissibility.

Ion and Water Permeability

Unexpectedly, it has been determined that the ion permeability through the lens correlates well with on-eye movement. As discussed earlier, it is known that on-eye movement of the lens is required to ensure good tear exchange, and ultimately, to ensure good corneal health. While the invention is not bound by theory presented herein, it may be useful to discuss some theory for a better understanding of ways to practice the invention.

It is theorized that water permeability is an exceptionally important feature for an extended-wear lens which includes oxyperm polymers such as those disclosed herein. Siloxane-containing oxyperm materials tend to adhere strongly to the eye, thereby stopping on-eye movement. The ability to pass water through the lens is believed to allow a siloxane-containing polymeric lens to move on the eye, where the movement occurs via forces exerted by water being squeezed out of the lens. The water permeability of the lens is also believed important in replenishing lens water content once pressure is removed. Further, the permeability of ions is believed to be directly proportional to the permeability of water. Thus, ion permeability is a predictor of on-eye movement.

However, regardless of whether the water permeability theory is a correct understanding of the actual on-eye movement phenomenon, it has been unexpectedly found that above a certain threshold of ion permeability through a lens, from the inner surface of the lens to the outer, or vice versa, the lens will move on the eye, and below the threshold the lens will adhere to the eye. Thus, the present innovative extended-wear contact lenses provide a balance between the relatively high oxygen permeability (and associated high binding capacity) of oxyperm materials with the low binding capacity (high on-eye-movement) of ionoperm materials. It is believed that this is accomplished by providing a plurality of continuous ion transmission pathways for ion and water movement through the lens.

It should be noted that ions may move through the lens via these ion pathways by a number of means. For example, ions may diffuse through the lens because of concentration differences from one surface to another. Ions may also be forced through the ion pathways by the mechanical action of blinking, with the concomitant compression forces on the lens essentially squeezing water out of the lens. In addition, the charge nature of the surfaces may provide an electromotive force which drives ion permeation through the lens. At times, one of these driving forces may be larger than the others, while at other times the relative magnitude may reverse. This discussion is presented to clarify that the invention is not restricted by the method or driving force by which ions move through the lens.

Neither the measurement of water permeability nor ion permeability through an ophthalmic lens is considered a routine matter of testing in the industry. Accordingly, a discussion of the preferred ion or water permeability ranges warrants a discussion of the measurement techniques used to determine the permeability.

The water permeability of a lens may be determined from the rate of water permeation through the lens, from one surface to another surface. The water permeability of a lens may be determined by positioning a lens between two reservoirs holding solutions having known, and different, initial concentrations of radiolabeled water (e.g., tritiated water), and then measuring concentration of radiolabeled water in the "receiving" reservoir (the reservoir towards which the net flow of radiolabeled water is positive) as a function of time.

The relative ion permeability of a lens may be determined from the rate of ion permeation may be determined by positioning a lens between two reservoirs holding solutions having known, and different, initial ion concentrations, and then measuring conductivity in the "receiving" reservoir (the reservoir towards which the net flow of ions is positive) as a function of time. The concentration of ions, such as sodium, can be measured accurately using a pH meter and an ion-selective electrode. Ions are believed to be transmitted through a lens, from inner to outer surfaces and vice versa, primarily by the diffusion of ions through water pathways in the lens. Ion permeability through a lens is believed to be directly proportional to water permeability through a lens.

Ionoflux Measurement Technique

The following technique, referred to herein as the "Ionoflux Technique", is a preferred method for determining the ion permeability of a lens. This technique may be used to determine the likelihood of adequate on-eye movement.

The "Ionoflux Technique" involves the use of a conductometer (LF 2000/C, catalog, no. 300105, Wissenschaftlich-Technische Werkstätten GmbH (WTW), Germany), an electrode equipped with a temperature sensor (LR 01/T, catalog no. 302 520, WTW)), a donor chamber containing a salt solution, a receiving chamber containing about 60 ml of dionized water, a stir bar and a thermostat.

The donor chamber is specially designed for sealing a contact lens thereto, so that the donor solution does not pass around the lens (i.e., ions may only pass through the lens). The donor chamber is composed of a glass tube which is threaded at the end which is immersed in the receiving solution. The glass tube includes a centrally located hole of about 9 mm in diameter. A lid, which a threaded to mate with the glass tube, holds a lens-retaining member which includes a centrally located hole of about 8 mm in diameter. The lens-retaining member includes a male portion adapted to mate with and seal the edges of the inner (concave) surface of a lens and a female portion adapted to mate with and seal the edges of the outer (convex) surface of a lens.

The lens to be measured is placed in the lens-retaining member, between the male and female portions. The male and female portions include flexible sealing rings which are positioned between the lens and the respective male or female portion. After positioning the lens in the lens-retaining member, the lens-retaining member is placed in the threaded lid. The lid is screwed onto the glass tube to define the donor chamber. The donor chamber is filled with 16 ml of 0.1 molar NaCl solution. The receiving chamber is filled with 60 ml of deionized water. The leads of the conductivity meter are immersed in the deionized water of the receiving chamber and a stir bar is added to the receiving chamber. The receiving chamber is placed in a thermostat and the temperature is held at about 35° C. Finally, the donor chamber is immersed in the receiving chamber.

Measurements of conductivity are taken every 20 minutes for about three hours, starting 10 minutes after immersion of the donor chamber into the receiving chamber. The Ionoflux Diffusion Coefficient, D, is determined by applying Fick's law as follows:

$$D = -n'/(A \times dc/dx)$$

where
   $n'$=rate of ion transport [mol/min]
   $A$=area of lens exposed [mm$^2$]
   $D$=Ionoflux Diffusion Coefficient [mm$^2$/min]
   dc=concentration difference [mol/L]
   dx=thickness of lens [mm]

An Ionoflux Diffusion Coefficient of greater than about $6.4 \times 10^{-6}$ mm$^2$/min is preferred for achieving sufficient on-eye movement. More preferably, the Ionoflux Diffusion Coefficient is greater than about $2.6 \times 10^{-6}$ mm$^2$/min, while most preferably, the Ionoflux Diffusion Coefficient is greater than about $1.5 \times 10^{-6}$ mm$^2$/min. It must be emphasized that the Ionoflux Diffusion Coefficient correlates with ion permeability through the lens, and thereby is a predictor of on-eye movement.

6. EXAMPLES

The present invention is further explained with reference to specific embodiments in the following examples which should not be construed to limit the scope of the claims. All temperatures are given in are given in degrees Celsius.

A Preparation of Macroinitiators

Example A-1

In a 250 ml round bottom two-necked flask provided with a Soxhlet extractor with condenser and a septum on the second ground joint, the Soxhlet extractor being filled with molecular sieve (4 Å), 29.5 g (6.34 mmol) Â,I-bis(3-hydroxypropyl)polydimethylsiloxane (IM 15 by Wacker Chemie, Munich, Germany, purified over a thin-film evaporator, 0.43 mEq OH/g, $M_n$=4651) were dissolved in 90 ml hexane and distilled under reflux for 17 hours in a nitrogen atmosphere. The solution then still contained 21 ppm water. Subsequently, the solution was concentrated to 60 ml hexane, cooled to 0° C. and 3.60 g (45.5 mmol) anhydrous pyridine were added. Then 12.4 g (43.9 mmol) trifluoromethanesulfonic acid anhydride (Fluka Chemie AG, Buchs, Switzerland) were added over 15 minutes and the mixture was stirred for another 30 minutes at a temperature of 0° C. After the addition of 20 ml chloroform (water content <10 ppm), the suspension was filtered under vacuum using a G4 glass filter funnel and was then evaporated at high vacuum (0.6–2 mbar). The yield was 18 g of an oil of orange colour. This oil was in turn dissolved in 40 ml of dry hexane (water content <10 ppm), activated charcoal was added and the mixture was then stirred for about 2 minutes and filtered again. After evaporation of the solution the yield was 15.8 g of a clear, colourless oil.

$^1$H-NMR (CDCl$_3$, 250 MHz); 0 ppm (CH$_3$—Si), 0.5 ppm (—CH$_2$—CH$_2$—Si—), 1.8 ppm (—CH$_2$—CH$_2$—CH$_2$—), 4.4 ppm (CF$_3$SO$_3$CH$_2$—CH$_2$—)

Functionality: >95% (based on the $^1$H-NMR data), i.e. >0.40 mEq triflate/g.

Example A-2

In a 250 ml round bottom two-necked flask provided with a Soxhlet extractor with condenser and a septum on the second ground joint, the Soxhlet extractor being filled with molecular sieve (4 Å), 25.6 g (5.49 mmol) Â,I-bis(3-hydroxypropyl)polydimethylsiloxane (IM 15 by Wacker Chemie, Munich, Germany, purified over a thin-film evaporator, 0.43 mEq OH/g, M$_n$=4651) were dissolved in 90 ml hexane and distilled under reflux for 17 hours in a nitrogen atmosphere. The solution then still contained 16 ppm water. Subsequently, the solution was concentrated to 50 ml hexane, cooled to a temperature of 0° C. and 3.26 g (41.2 mmol) anhydrous pyridine were added. Then 10.25 g (36.3 mmol) trifluoromethanesulfonic acid anhydride (Fluka Chemie AG, Buchs, Switzerland) were added for 15 minutes and the mixture was stirred for another 30 minutes at a temperature of 0° C. After the addition of 20 ml chloroform (water content <10 ppm), the suspension was filtered off under vacuum using a G4 glass filter and was then evaporated at high vacuum (0.6–2 mbar). The yield was 15.5 g of an oil of orange colour. This oil was in turn dissolved in 40 ml of dry hexane (water content <6 ppm), activated charcoal was added and the mixture was stirred for about 2 minutes and filtered again. After evaporation of the solution the yield was 15.4 g of a clear, colourless oil.

Functionality: >95% (based on the $^1$H-NMR data), i.e. >40 mEq triflate/g.

Example A-3

In a 250 ml round bottom two-necked flask provided with a Soxhlet extractor with condenser and a septum on the second ground joint, the Soxhlet extractor being filled with molecular sieve (4 Å), 30.9 g (10.5 mmol) Â,I-bis(3-hydroxypropyl)polydimethylsiloxane (IM 11 by Wacker Chemie, Munich, Germany, purified over a thin-film evaporator, 1.33 mEq OH/g, M$_n$=1503) were dissolved in 70 ml hexane and distilled under reflux for 17 hours in a nitrogen atmosphere until the water content was 36 ppm. Then 20 ml dry 1,2-dichloroethane (3.6 ppm) were added, the mixture was cooled to a temperature of 0° C. and 7.7 g (96.9 mmol) pyridine were added. Then 23.4 g (82.8 mmol) trifluoromethanesulfonic acid anhydride (Fluka Chemie AG, Buchs, Switzerland) and 40 ml dry 1,2-dichloroethane were added for 15 minutes and the mixture was stirred for another 30 minutes at a temperature of 0° C. The suspension was filtered off under vacuum using a cotton filter and was then evaporated at high vacuum (0.6–2 mbar). The yield was 35.7 g of an oil. This oil was in turn dissolved in dry hexane (water content <10 ppm), activated charcoal was added and the mixture was then stirred for about 2 minutes and filtered again. After evaporation of the solution the yield was 21.2 g of a clear, colourless oil.

$^1$H-NMR (CDCl$_3$, 250 MHz); 0 ppm (CH$_3$—Si), 0.5 ppm (—CH$_2$—CH$_2$—Si—), 1.8 ppm (—CH$_2$—CH$_2$—CH$_2$—), 4.4 ppm (CF$_3$SO$_3$CH$_2$—CH$_2$—)

Functionality: >95% (based on the $^1$H-NMR data), i.e. >1.06 mEq triflate/g.

Example A-4

To 100 ml highly purified dry chloroform (Fluka Chemie AG, Buchs, Switzerland) in a dry 250 ml round bottom three-neck flask with a septum 28.7 g intensively dried Â,I-hydroxyethyl-functionalized perfluoropolyether (Fomblin, ZDOL TX, Ausimont S.p.A., Bollate, Italien) with an average molecular weight of 1146 g/mol were added. The solution was cooled to −60° C. Then 4.15 g anhydrous pyridine (Merck 7463, 99.5%, Merck AG, Darmstadt, Germany) were added and subsequently 15.55 g trifluoromethanesulfonic acid anhydride (Fluka 91737, Fluka Chemie AG, Buchs, Switzerland) were slowly added over a period of 15 minutes. The resulting suspension was stirred for 25 minutes at a temperature of −60° C. Then the mixture was heated to room temperature and immediately filtered through a G4 glass filter funnel and the resulting salt was separated. After removal of all volatile components by means of a rotary evaporator and subsequent evacuation to 0.01 mbar a yellow, slightly oily, clear liquid was obtained. For further purification, this liquid was dissolved in 80 ml chloroform and a pinch of activated charcoal was added. After 5 minutes of stirring, the mixture was filtered over Hyflo, (Fluka Chemie AG, Buchs, Switzerland) and the solvent was completely removed in vacuum. 15.6 g of a clear, colourless, viscous liquid were obtained.

Example A-5

5.6 g polybutadiene diol (Aldrich no. 19,079-9; 0.79 mEq —OH/g) corresponding to 4.4 mEq OH were dissolved in 130 ml dry hexane. The solution was dried under reflux for two hours over a Soxhlet extractor filled with molecular sieve 4 Å. Titration according to Karl Fischer: 15 ppm water. Subsequently, 80 ml hexane were distilled into the Soxhlet and the polymer solution was cooled in an ice bath. At a temperature of 0°–5° C. 2.6 g absolute pyridine (=33 mmole) were added. Then 9.0 g trifluoromethanesulfonic acid anhydride (=33 mmole) were added dropwise for 30 minutes, which caused a pasty precipitation. After the addition of 20 ml toluene and 20 ml chloroform, the solution was stirred briefly and filtered over a G4 filter. The clear solution was evaporated and dried at high vacuum. A clear, colourless, highly viscous product was obtained. The content of trifluoromethane sulfonic acid ester was then determined by means of titration:

0.66 mEq/g correspond to 92.3% of the theoretical value (0.71 mEq).

Example A-6

Analogously to Example A-5, a polybutadiene diol (PolySciences no. 06508; 0.97 mEq —OH/g) with an average molecular weight of about 2,100 was reacted.

Example A-7

Analogously to Example A-5, 5.6 g polybutadiene diol (Aldrich no. 19,079-9) were reacted with 2.6 g pyridine and 9.0 g trifluoromethanesulfonic acid. Instead of toluene/chloroform, pure chloroform was used as a solvent. The yield of polybutadiene-bis-triflate macromer was 97%.

Example A-8

10.0 g polybutadiene diol (Aldrich no. 19,079-9; 0.79 mEq —OH/g), corresponding to 7.90 mEq were dissolved in 130 ml dry hexane. The solution was dried under reflux for two hours over a Soxhlet extractor filled with molecular sieve 4. Titration according to Karl Fischer: 15 ppm water. Subsequently, the solution was slowly added dropwise to a mixture of 1.76 isophorone diisocyanate (M=222; corresponding to 7.90 mmole) and 10 mg dibutyltin dilaureate. After the reaction had taken place, the solution was added dropwise to 14.80 g polydimethylsioxane diol (Shinetsu KF-6001, 1.07 mEq —OH/g), corresponding to 15.8 mEq —OH, and stirred overnight at room temperature. The resulting tri-block copolymer was then added to 5.2 g pyridine (corresponding to 65 mmole). At a temperature of 0°–5° C. 18.4 g trifluoromethanesulfonic acid anhydride (M=282,13) (corresponding to 65 mmole) were added for 30 minutes. This caused a pasty precipitation. After the addition of 20 ml toluene and 20 ml chloroform, the solution was stirred briefly and filtered over a G4 filter. The clear solution was evaporated at a rotary evaporator and subsequently the remaining solvent was removed at high vacuum. A clear, colourless, highly viscous product was obtained. The content of trifluoromethane sulfonic acid ester was then determined by means of titration:

0.349 mEq triflate groups/g, corresponding to 97.5% of the theoretical value.

Example A-9

1.) Synthesis of a hydrophobic block consisting of various subsegments 22.2 g (0.1 mole) freshly distilled isophorone diisocyanate under argon and 50 mg dibutyltin dilaureate were filled into a three neck flask. A drip funnel was filled with 51.5 g (50 mmole) of the perfluoropolyether Fomblin® ZDOL (by the company Ausimont S.p.A., Milan) with an average molecular weight of 1,030 g/mole, according to terminal groups analysis 1.96 mEq/g hydroxy groups. The drip funnel was put on the three neck flask and the equipment was evacuated to about 20 mbar under stirring and subsequently unstressed with argon. This was repeated twice. Then the perfluoropolyether was added dropwise for two hours. By means of cooling in a water bath, the temperature in the flask was held under 30° C. After stirring overnight at room temperature, the reaction was finished. Isocyanate titration showed a content of 1.40 mEq/g NCO (theoretical value: 1.35 mEq/g).

202 g of the α,ω-hydroxypropyl-terminated polydimethylsiloxane KF-6001 by Shinetsu with an average molecular weight of 2,000 g/mole (according to titration 1.00 mEq/g hydroxy groups) were put into a flask. The content of the flask was evacuated to about 0.1 mbar and unstressed with argon. This was repeated twice. The degasified siloxane was dissolved in 202 ml freshly distilled toluene stored under argon and 100 mg dibutyltin dilaureate were added. After complete homogenization of the solution, the entire amount of the perfluoropolyether reacted with IPDI was added under argon. After stirring overnight at room temperature, the reaction was finished. The solvent was removed at high vacuum at room temperature. Microtitration showed 0.37 mEq/g hydroxy groups (theoretical value: 0.37 mEq/g).

2.) Synthesis of the bis-triflate macroinitiator

In a dry 250 ml round bottom three neck flask with a septum 33.2 g of the hydroxy-terminated polydimethylsiloxane perfluoropolyether tri-block copolymer were degasified and dried at a temperature of 80° C. and under a pressure of 0.1 mbar. After cooling to room temperature 80 ml dry hexane were added and the solution was cooled to 0° C. Then 2.45 g anhydrous pyridine (Merck 7463; 99.5%) were added, subsequently, 8.68 g trifluoromethanesulfonic acid anhydride (Fluka 91737) were slowly added for 15 minutes. The resulting viscous suspension was stirred at 0° C. for 25 minutes. The mixture was then heated to room temperature, diluted with another 80 ml hexane and immediately filtered over a G4 glass filter so that the resulting salt was removed. After removal of all volatile components at a rotary evaporator, finishing at 0.01 mbar, a yellow, slightly oily, clear liquid was obtained.

B Preparation of Amphiphilic Segmented Copolymers

Example B-1

2.22 g (26.1 mmol) 2-methyl-2-oxazoline and 6.94 g (1.4 mmol) of the macroinitiator prepared in Example A-1 were added to 15 ml 1,2-dichloroethane (water content 5 ppm) at room temperature. After the solution was stirred for 1.5 hours at room temperature, the temperature was increased to 40° C. After 48 hours the solution was cooled to room temperature and 5.5 ml 0.5N KOH/EtOH solution were added. This solution was then stirred for one hour and subsequently evaporated at high vacuum (0.6–2 mbar).

$^1$H-NMR; 0 ppm ($CH_3$—Si), 2.0–2.1 ppm ($CH_3CON <$), 3.3–3.5 ppm (>N—$CH_2$—$CH_2$—N <)

Functionality: OH titration: 0.40 mEq/g Titration of residual cationic terminal groups: 0.02 mEq/g GPC in THF: 1 peak with shoulder against lower molecular weights, maximum peak at about 6500 based on polystyrene as a standard.

Example B-2

In a 25 ml pear-shaped flask, 3.1 g of the macroinitiator prepared in Example A-4 (2.12 mmol) were dissolved in 7.1 ml anhydrous chloroform (Fluka 25690, Fluka Chemie AG, Buchs, Switzerland) and 1.8 g (21.2 mmol) dry 2-methyl-2-oxazoline were added. The mixture was stirred at 40° C. overnight. Subsequently, the complete reaction of the monomer was checked by means of $^1$H-NMR.

Example B-3

0.5 g of dried macroinitiator, prepared in Example A-5 (corresponding to 0.33 mEq triflate ester) were dissolved in dry 1,2-dichloroethane. Subsequently, 1.0 g 2-methyl-2-oxazoline (corresponding to 12 mmole) were added. The solution was stirred for 30 minutes at room temperature and then for 48 hours at a temperature of 60° C. After the solvent had been removed at high vacuum, a white, solid tri-block copolymer was obtained.

Example B-4

As described in Example B-3, 2.5 g (0.873 mEq triflate groups) of the polybutadiene/polydimethylsiloxane macroinitiator obtained in Example A-8 were dissolved in 100 ml dry 1,2-dichloroethane and, after addition of 2.45 g (28.8 mmole) 2-methyl-2-oxazoline, the solution was stirred for 48 hours at a temperature of 70° C. The obtained solution was evaporated to a total of 30 ml and subsequently precipitated in methanol. After the solvents as well as the unreacted monomer had been removed from the viscous precipitate at high vacuum, 4.8 g of a clear, highly viscous product were obtained (97% of the theoretical value).

Preparation of amphiphilic segmented copolymers having terminal OH-groups

Example B-5

Analogously to Example B-3, 0.5 g dried macroinitiator of Example A-5 were dissolved in dry acetonitrile instead of in 1,2-dichloroethane and reacted with 2-methyl-2-oxazoline. Then an equimolar amount of a 0.5N KOH solution in ethanol was added and was left to stir for 30 minutes. The product was dried at high vacuum, dissolved in THF, activated charcoal was added and the product was filtered and dried. A solid, white HO-terminated copolymer with terminal OH-groups was obtained.

Example B-6

As described in Example B-5, 1 g of the copolymer still having triflate terminal groups as obtained in Example B-3 was dissolved in dichloroethane and treated with KOH/EtOH. After processing and cleaning in the described manner, 0.96 g of a clear, colourless (0.17 mEq HO-/g) copolymer with terminal OH-groups were obtained.

Example B-7

In a 500 ml pear-shaped flask 15.4 g of the microinitiator obtained in Example A-9 (2.85 mmole) were dissolved in 25 ml anhydrous 1,2-dichloroethane and 5.82 g (68.4 mmole) dry 2-methyl-2-oxazoline were added. The mixture was stirred overnight at a temperature of 40° C. Subsequently, the entire reaction of the monomer is examined by means of $^1$H-NMR. 11.4 ml of a 0.5 molar ethanolic solution of potassium hydroxide (5.7 mmole KOH) were added to the solution and it was stirred for one hour at room temperature. Then the solution was evaporated and all the volatile components were removed in vacuum (0.01 mbar).

C Preparation of Functionalized Amphiphilic Segmented Copolymers

Example C-1

In a round bottomed flask, 6.62 g (2.64 mEq) of the amphiphilic segmented copolymer obtained in Example B-1 were dissolved at room temperature in 20 ml dry ethyl acetate (water content <10 ppm) and 420 mg (2.7 mmol) 2-isocyanato-ethylmethacrylate (IEM) and about 40 mg dibutyltin dilaureate were added. The solution was stirred for 48 hours in the absence of light and was then evaporated at high vacuum (0.6–2 mbar) for 5 hours at a temperature of 0° C. 6.89 g of a colourless solid macromer were obtained.

Functionality: OH titration: 0.11 mEq/g (27.5% of the OH-groups are unreacted)

GPC in THF: 2 peaks, maximum peaks at 400 (small peak) and 6500 based on polystyrene as a standard.

Example C-2

In a round bottomed flask, 18.0 g (6.48 mEq OH) of an amphiphilic segmented copolymer obtained in Example B-1 were dissolved at room temperature in 40 ml dry ethyl acetate (water content <20 ppm) and 1.04 mg (6.7 mmol) 2-iso-cyanatoethylmethacrylate (IEM) and about 40 mg dibutyltin dilaureate were added. After 45 hours and 69 hours two portions of 40 mg each of dibutyltin dilaureate were added. After another 24 hours, 2 ml methanol were added to the solution, the solution was filtered through a microfilter with 0.451 μm pores and was then evaporated at high vacuum (0.6–2 mbar) at a temperature of 0° C. 18.1 g of a solid macromer were obtained.

Functionality: OH titration: 0.05 mEq/g double bonds: 0.37 mEq/g

Example C-3

8.5 ml of a 0.5 molar ethanol solution of potassium hydroxide (4.24 mmol KOH) were added to the reaction mixture obtained in Example B-2 and the mixture stirred for one hour at room temperature. Then the solvent was evaporated and all volatile components were removed in vacuum (0.01 mbar). Titration analysis showed a concentration of hydroxyl groups of 1.05 mEq/g.

The reaction mixture obtained was then dissolved in 14 ml anhydrous dichloromethane and 0.6 g (3.9 mmol) 2-isocyanatoethylmethacrylate and 1 drop dibutyltin dilaureate were added. The mixture was stirred overnight at room temperature in the absence of light. An IR-spectrum showed the absence of isocyanate groups in the solution. Then the mixture was diluted with ethanol and slowly filtered over a bed of aluminium oxide with an activity level of 5. The filtrate was evaporated and all volatile components were removed at 0.01 mbar. A very solid and tough substance was obtained. Titration analyses showed an amount of C=C double bonds of 0.95 mEq/g. The content of hydroxy and isocyanate groups was below the identification limit of 0.01 mEq/g.

Example C-4

In a round bottom three-neck flask made of brown glass 15.53 g (2.64 mEq HO-groups) of the HO-terminated block copolymer obtained in Example B-6 were dissolved in the absence of light in 50 ml dry ethylacetate and, while the solution was stirred at room temperature, 420 mg (2.7 mmole) 2-isocyanate-ethylmethacrylate (IEM) and 40 mg dibutyltin dilaureate as a catalyst were added. After 48 hours of reaction time, solvents as well as excess IEM were removed from the mixture at a temperature of 0° C. and under a pressure of 0.6 mbar for a total of 10 hours. 15.85 g of a clear, very highly viscous product were obtained, corresponding to 99% of the theoretical value. The titration of the unsaturated terminal groups yields a value of 0.16 mEq/g.

Example C-5

As described in Example B-4, an amphiphilic segmented copolymer was prepared which consisted of a central polybutadiene/polysiloxane block and two terminal poly-2-methyl-2-oxazoline blocks. Instead of the precipitation in methanol, however, the solvent was completely removed from the product at high vacuum. 10 g of the obtained product were dissolved in 50 ml dry nitromethane and subsequently the living oxazolinium triflate terminal group was reacted with acrylic acid and 2,6-lutidine. For this purpose, the nitromethane solution was reacted as described in the literature (M. Miyamoto et. al., Macromolecules 22, p. 1604–1607 (1989)) with twice the stoichiometric amount of acrylic acid and six times the amount of 2,6-lutidine for 24 hours at a temperature of 70° C. After processing as described with the help of an ion exchange resin, 9.2 g of a clear, highly viscous product with terminal acryloyl groups were obtained. Titration of the unsaturated terminal groups yields a value of 0.14 mEq/g, which corresponded to 82.3% of the theoretical value.

Example C-6

The reaction mixture obtained in Example B-7 was dissolved in 30 ml anhydrous dichloromethane and 0.88 g (5.7 mmole) isocyanate-ethylmethacrylate as well as a drop of dibutyltin dilaureate were added. The mixture was stirred overnight at room temperature in the absence of light. An IR-spectrum showed the absence of isocyanate groups in the solution. Then the mixture was diluted with ethanol and slowly filtrated over a bed of aluminium oxide with an activity level of 5. The filtrate was evaporated and all the volatile components were removed at 0.01 mbar. A very solid and tough paste was obtained. Titration analyses showed a content of C=C double bonds of 0.25 mEq/g. The content of hydroxy and isocyanate groups is below the identification limit of 0.01 mEq/g.

Thus, by carrying out the reaction sequence of Examples A-9, B-7 and C-6, an amphiphilic segmented copolymer (wherein the hydrophobic block consists of various subsegments and which contains polymerizable end groups at the hydrophilic segments) can be obtained.

D Preparation of Films and Determination of the Morphology

Example D-1

4.14 g of the functionalized amphiphilic segmented copolymer obtained in Example C-1 and 0.26 g 1,3-bis(3-methacryloxypropyl)tetramethyl-disiloxane (crosslinking agent) were dissolved in 4.4 g 1-propanol and filtered under pressure through a microfilter with 0.45 µm pores. 16.9 mg photoinitiator (Darocur 1173, CIBA AG, Basel, Switzerland) were added to 6.9 g of the filtered solution. Then the solution was frozen three times in liquid nitrogen for degassing, the flask was evacuated at high vacuum (1.2 mbar) then warmed up to room temperature. Then films were cast from the formulation by removing the solvent thinly spread on a glass surface. After contrasting with $OsO_4$, the optically clear films show a lamellar microphase structure in the submicron range (<100 nm) in Transmission Electron Micrographs.

The obtained films were dried and degassed under reduced pressure and then irradiated with UV-light (15 $mW/cm^2$) in a silica flask. After the crosslinking the clear film was extracted with isopropanol. The extractable portions amounted to about 30%. Transmission electron microscopy showed a lamellar morphology due to which the two polymer blocks could easily be distinguished from one another. The thickness of the PDMS lamellae was about 10 nm and that of the polyoxazoline lamellae was about 4 nm. The size of the lamellar microdomains in the matrix was below 1 µm. The 3-dimensional arrangement of these microdomains within the matrix yields overall a bicontinuous morphology.

E Preparation of Contact Lenses

Example E-1

4.14 g of the functionalized amphiphilic segmented copolymer obtained in Example C-1 and 0.26 g 1,3-bis(3-methacryloxypropyl)tetramethyl-disiloxane (crosslinking agent) were dissolved in 4.4 g 1-propanol and filtered under pressure through a microfilter with 0.45 µm pores. 16.9 mg photoinitiator (Darocur 1173, CIBA AG, Basel, Switzerland) were added to 6.9 g of the filtered solution. Then the solution was frozen three times in liquid nitrogen for degassing, the flask was evacuated at high vacuum (1.2 mbar) then warmed up to room temperature. In a nitrogen atmosphere (remaining oxygen content <3 ppm) the formulation was irradiated with 15 $mW/cm^2$ UV light in polypropylene contact lens moulds for 5 minutes. The obtained clear and colourless lenses were left to swell in isopropanol and were extracted in isopropanol for 2 days and subsequently re-equilibrated in water. The re-equilibrated lenses were sterilized by autoclaving for 30 minutes at a temperature of 121° C. The physical data were measured on the autoclaved lenses.

The ion diffusion coefficient (Ionoflux—for determination see page 48 above; Ionoflux Measurement Technique):

$3.93 \times 10^{-5}$ $mm^2$/minute $O_2Dk$ [barrers]:102

Water uptake [% w/w]:14

E-modulus [MPa]:1.2

Tear strength [MPa]:1.1

Elongation at break [%]:130

Examples E-2 to E-8

According to Example E-1, the contact lenses given in Table 1 were prepared, autoclaved as described and characterized:

TABLE 1

| Lens | PMOXA [% w/w] | Cross-linking agent [% w/w] | water uptake [% w/w] | Ionoflux [×$10^{-5}$ $mm^2$/min] | E [MPa] | $\sigma_R$ [MPa] | $S_R$ [%] | $O_2Dk$ [barrers] |
|---|---|---|---|---|---|---|---|---|
| Example E-2* | 13.6 | 5.2 | 7 | 0.19 | 0.9 | 0.8 | 250 | 174 |
| Example E-3* | 22.5 | 5.2 | 15 | 3.14 | 1.6 | 1.0 | 210 | 121 |
| Example E-4 | 19.7 | 7.2 | 11 | 1.73 | 1.7 | 1.0 | 170 | 139 |
| Example E-5 | 22.4 | 5.9 | 15 | 2.17 | 2.3 | 1.3 | 130 | 106 |
| Example E-6 | 21.0 | 0 | — | 4.33 | 1.3 | 0.4 | 35 | 146 |
| Example E-7° | 22.3 | 0 | — | 5.65 | — | 0.4 | 34 | 15 |
| Example E-8 | 23.8 | 0 | 13 | 1.22 | 2.4 | 1.3 | 115 | 123 |

*In the formulation ethyl acetate was used as solvent
°The PDMS-segment with $M_a$ = 1500
$\sigma_R$ = tear strength
$S_R$ = elongation at break

Example E-9

1.17 g of the functionalized copolymer obtained in Example C-2, 66 mg 1,3-bis(3-methacryloxypropyl) tetramethyl-disiloxane (crosslinking agent) and 9 mg Darocur 1173, CIBA AG, Basel, Switzerland, (photo initiator) were dissolved in 1.21 g 1-propanol. Half of the formulation was frozen three times in liquid nitrogen, the flask was evacuated at high vacuum (1.2 mbar) and the solution was then brought back to room temperature in the closed flask (degassing) before it was filled into polypropylene contact lens moulds. The other half of the formulation was filled untreated into polypropylene contact lens moulds. Both formulations were irradiated for 10 minutes with 22.5 mW/cm$^2$ UV light. The obtained colourless clear lenses were left to swell in isopropanol and were extracted in isopropanol for at least 30 hours and subsequently re-equilibrated in water. The re-equilibrated lenses were autoclaved for 30 minutes at a temperature of 121° C. The physical data were measured at the autoclaved lenses and are given in Table 2.

TABLE 2

| Lens | O$_2$Dk [barrers] | Ionoflux [×10$^{-5}$ mm$^2$/min] | water uptake [% w/w] | extractable portions [% w/w] |
|---|---|---|---|---|
| Example E-9 (without degassing) | 102 | 2.67 | 14.4 | 11.1 |
| Example E-9 (with degassing) | 105 | 3.30 | 14.9 | 10.3 |

Example E-10

Comonomer N,N-dimethyl-acrylamide (DMA)

To a formulation analogous to that of Example E-5 were added 24% w/w N,N-dimethylacrylamide. Analogously to Example E-1, the formulation was irradiated and extracted. The lenses showed a water uptake of 42% w/w, ion permeability of 17.58×10$^{-5}$ mm$^2$/minute, O$_2$Dk of 33 barrers and an E-modulus of 2.4 MPa as well as 1050% elongation at break.

Example E-11

Comonomer TRIS

To a formulation analogous to that of Example E-5 were added 24% w/w 3-[tris(trimethylsiloxy)-silyl]propylmethacrylate (TRIS). Analogously to Example E-1, the formulation was irradiated and extracted. The lenses showed a water uptake of 11.5% w/w, ion permeability of 0.63×10$^{-5}$ mm$^2$/minute, O$_2$Dk of 132 barrers and an E-modulus of 1.4 MPa as well as 145% elongation at break.

Example E-12

EGDMA as an alternative crosslinking agent

In a formulation as described in Example E-5 the crosslinking agent was replaced by the crosslinking agent ethyleneglycoldimethacrylate (EGDMA). The lenses were prepared analogously to Example E-1. The lenses showed a water uptake of 9.8% w/w, ion permeability of 0.44×10$^{-5}$ mm$^2$/minute, O$_2$Dk of 115 barrers and an E-modulus of 2.6 MPa as well as 90% elongation at break.

Example E-13

1.56 g of the functionalized copolymer obtained in Example C-3 were dissolved in 0.56 g ethanol and 10 mg of the photoinitiator Darocur 1173, (Ciba AG, Basel, Switzerland) were added. In order to remove the atmospheric oxygen, the flask containing the solution was frozen in liquid nitrogen, evacuated to 0.01 mbar and brought back to room temperature. This process was repeated twice. Subsequently, the evacuated flask was introduced into a glove box filled with nitrogen, in which the degassed solution of the macromer was measured with a pipette into polypropylene contact lens moulds. The moulds are closed and irradiated for 5 minutes with UV light at an intensity of 15 mW/cm$^2$. The moulds were removed from the glove box and opened. The obtained contact lenses were extracted in isopropanol for 24 hours, equilibrated in phosphate-buffered sodium chloride solution and sterilized by autoclaving for 30 minutes at a temperature of 121° C. The obtained contact lenses had an extractable portion of 3.1% w/w in dichloromethane, a water uptake of 24.5% w/w and an ionoflux ion permeability of 6×10$^{-5}$ mm$^2$/min.

What is claimed is:

1. An amphiphilic segmented copolymer comprising at least one segment A and at least one segment B wherein segment A comprises an oxygen-permeable polymer and segment B comprises an ion-permeable polymer, segments A and B being linked together through a non-hydrolyzable bond, and wherein the copolymer contains at least one polymerizable unsaturated group.

2. A copolymer according to claim 1, wherein segment A comprises a polysiloxane of Formula (I)

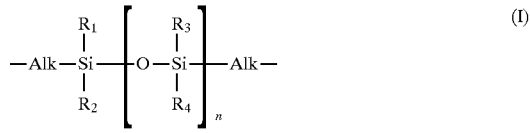

in which n is an integer from 5 to 200; Alk is alkylene having up to 20 carbon atoms; 80–100% of the radicals $R_1$, $R_2$, $R_3$ and $R_4$, independently of one another, are alkyl and 0–20% of the radicals $R_1$, $R_2$, $R_3$ and $R_4$, independently of one another, are alkenyl, aryl, fluoroalkyl or cycloalkyl.

3. A copolymer according to claim 2, wherein is an integer from 5 to 120.

4. A copolymer according to claim 2, wherein 85–100% of the radicals $R_1$, $R_2$, $R_3$, and $R_4$, independently of one another, are lower alkyl having up to 8 carbon atoms.

5. A copolymer according to claim 2, wherein 0–15% of the radicals $R_1$, $R_2$, $R_3$ and $R_4$, independently of one another, are lower alkenyl, phenyl which is unsubstituted or substituted by lower alkyl or lower alkoxy, fluoro(lower alkyl) or cyano(lower alkyl).

6. A copolymer according to claim 1, wherein segment A comprises a perfluoroalkyl polyether of Formula (II)

in which x+y is a number in the range from 10 to 100; each Z, independently of the others, is a divalent radical having up to 12 carbon atoms or a bond; each E, independently of the others, is —(OCH$_2$CH$_2$)$_q$—, where q has a value of from 0 to 2 as a statistical average; the link —Z—E— represents the sequence —Z—(OCH$_2$CH$_2$)$_q$—; and k is 0 or 1.

7. A copolymer according to claim 6, wherein Z is a bond, lower alkylene or —CONH-arylene, where the —CO— moiety is linked to a CF$_2$ group.

8. A copolymer according to claim 6, wherein Z is lower alkylene.

9. A copolymer according to claim 6, wherein the indices x+y are a number in the range from 10 to 50.

10. A copolymer according to claim 6, wherein the ratio x:y is in the range from 0.5 to 1.5.

11. A copolymer according to claim 1, wherein segment A comprises an unsaturated polymer comprising repeating units selected from units of Formulae (III) and (IV)

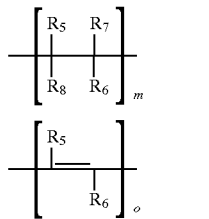

wherein

R$_5$ is hydrogen, alkyl or trialkyl-silyl;

R$_6$ is alkyl, unsubstituted or substituted by alkoxy, alkoxycarbonyl, hydroxy, carboxyl, halogen or aryl; alkenyl, unsubstituted or substituted by alkoxy, alkoxycarbonyl, carboxyl, halogen or aryl; or alkenyl, unsubstituted or substituted by alkoxy, alkoxycarbonyl, carboxyl, halogen or aryl; and R$_7$ and R$_8$, independently of one another, are hydrogen or alkyl;

or R$_6$ and R$_7$, taken together, are —(CH$_2$)$_p$—, wherein p is an integer of 3 to 5, or R$_6$ and R$_7$, taken together, are a divalent residue of Formula (V)

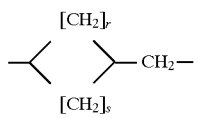

wherein r and s, independently of one another, are an integer of 1 to 3, but do not have at the same time the value 1;

R$_7$ and R$_8$, taken together, are —(CH$_2$)$_p$—, wherein p is as defined above;

m and o, independently of one another, are an integer of 10 to 100,000; and the sum of m and o is an integer of 20 to 100,010.

12. A copolymer according to claim 11, wherein the unsaturated polymer comprises repeating units selected from units of Formula (III) and (IV), wherein R$_5$, R$_7$ and R$_8$ are hydrogen and R$_6$ is lower alkenyl or lower alkenyl substituted by halogen, preferably lower alkenyl having up to 4 carbon atoms.

13. A copolymer according to claim 11, wherein the unsaturated polymer comprises repeating units of Formula (IV) wherein R$_5$ is tri lower alkylsilyl and R$_6$ is lower alkyl.

14. A copolymer according to claim 11, wherein the unsaturated polymer comprises alternating repeating units of Formula (III) and (IV), wherein R$_5$, R$_7$ and R$_8$ are hydrogen and R$_6$ is lower alkyl or lower alkenyl having up to 4 carbon atoms.

15. A copolymer according to claim 11, wherein the unsaturated polymer is selected from syndiotactic poly-1,2-butadiene, poly-1,4-butadiene and polyisoprene.

16. A copolymer according to claim 1, wherein segment A comprises a polysulfone comprising at least one of the structural elements VIa) to VId)

  (VIa)

  (VIb)

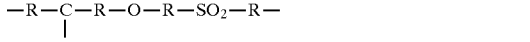  (VIc)

  (VId)

wherein R is structural element VIa) is alkylene or arylene and R in structural elements VIb), VIc) and VId) is arylene, especially phenylene.

17. A copolymer according to claim 1, wherein segment A comprises two or more subsegments selected from polysiloxanes of Formula (I) as defined in claim 2, perfluoroalkyl polyethers of Formula (II) as defined in claim 6, unsaturated polymers comprising repeating units of Formulae (III) and (IV) as defined in claims 11, and polysulfones as defined in claim 16.

18. A copolymer according to claim 1, wherein segment A comprises perfluoroalkyl polyether or polybutadiene subsegments (a) and polysiloxane subsegments (b).

19. A copolymer according to claim 1, wherein segment B is derived from a cyclic imino ether compound of Formula (VII)

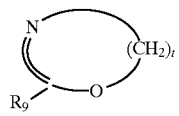

wherein R$_9$ is hydrogen, alkyl, hydroxyalkyl or alkenyl having up to 22 carbon atoms and optionally containing ether, ester or urethane groups, cycloalkyl, aralkyl or aryl; and t is 2 or 3.

20. A copolymer according to claim 19, wherein the cyclic imino ether compound is a 2-alkyl, or 2-alkenyl oxazoline or a 2-(hydroxyalkyl)oxazoline or a 2-isocyanatoethyl methacrylate adduct thereof.

21. A copolymer according to claim 20, wherein the cyclic imino ether compound is 2-methyl oxazoline, 2-(hydroxymethyl)oxazoline or 2-(hydroxyethyl)oxazoline.

22. A copolymer according to claim 1, wherein segment B is derived from a vinyl ether of Formula (VIII)

  (VIII)

wherein R$_{10}$ is alkyl or alkoxy alkyl having 1 to 10 carbon atoms; or from dioxolane, a dioxetane or cyclic ether of Formulae (IX), (X) or (XI)

  (IX)

  (X)

  (XI)

wherein u is an integer of 3 to 5; each R$_{11}$ is independently hydrogen, alkyl or alkenyl having up to 22 carbon atoms and optionally containing ether, ester or urethane groups, cycloalkyl, aralkyl or aryl; and $R_{12}$ is alkyl, alkenyl or alkoxyalkyl having up to 4 carbon atoms.

23. A copolymer according to claim 22, wherein the vinyl ether is methyl vinyl ether, ethyl vinyl ether or methoxy ethyl vinyl ether.

24. A copolymer according to claim 22, wherein the cyclic ether is oxetane.

25. A copolymer according to claim 22, wherein the cyclic ether is ethylene oxide or propylenoxide.

26. A copolymer according to claim 22, wherein the cyclic ether is methyl glycidyl ether, vinyl glycidyl ether, allyl glycidyl ether or ethoxyethyl glycidyl ether.

27. A copolymer according to claim 1, wherein segment B is derived from an N-substituted aziridine, β-lactone or β-lactame.

28. A copolymer according to claim 1, which is a di-block comprising one segment A and one segment B.

29. A copolymer according to claim 1, which is a tri-block comprising one segment A and two segments B which are attached to the ends of segment A, or comprising one segment B and two segments A which are attached to the ends of segment B.

30. A copolymer according to claim 1, which is a comb-type copolymer of the Formula (XII) or (XII')

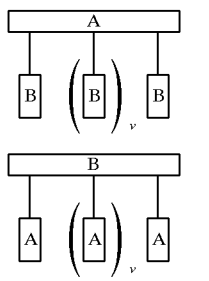

wherein the segments B are pendent from segment A or segments A are pendent from segment B; and v is an integer of 0 to 20.

31. A copolymer according to claim 29, wherein further hydrophobic segments A' and/or further hydrophilic segments B' which are composed of the same or different monomers as segments A and B are attached to the ends of segments A or B.

32. A copolymer according to claim 1, wherein the at least one polymerizable unsaturated group is present within any one of segments A, B, A' or B' or is present at the end of the terminal segment.

33. A process for the preparation of a copolymer according to claim 1, comprising the steps of
    a) providing at least one thermally or photochemically activable cationic or radical initiator group on at least one end or pendent from a compound serving as segment A or segment B in the copolymer;
    b) conducting a graft polymerization at the initiator group present on the said segment A or segment B using a monomer from which segment B or segment A, respectively, is derived;
    c) optionally changing the monomer and conducting further graft polymerization using a hydrophobic or hydrophilic monomer which is the same or different from the monomer making up segments A and B to produce further hydrophobic segments A' and/or further hydrophilic segments B', and if a polymerizable final unsaturated group should be provided at the end of the growing segment;
    d) reacting the segmented copolymer thus obtained or a suitable derivative therefrom with a functionalized compound carrying a polymerizable unsaturated group.

34. A polymeric product which is obtainable by further polymerizing a copolymer according to claim 1 through the polymerizable unsaturated group(s), optionally in the presence of further vinylic comonomers and optionally of cross-linking agents containing at least two unsaturated groups.

35. A polymeric product according to claim 34, wherein the vinyl comonomer comprises at least one hydrophobic comonomer.

36. A polymeric product according to claim 35, wherein the hydrophobic comonomer is selected from methyl methacrylate, TRIS, DSPMA and acrylonitrile.

37. A polymeric product according to claim 34, wherein the vinyl comonomer comprises at least one hydrophilic comonomer.

38. A polymeric product according to claim 37, wherein the vinylic comonomer is selected from hydroxy ethyl methacrylate, N-vinyl pyrolidone, N,N-dimethylacrylamid, (meth)-acrylic acid, dihydroxypropyl-methacrylate and acrylamide.

39. A polymeric product according to claim 34, wherein the vinylic comonomer comprises at least one hydrophobic and at least one hydrophilic comonomer.

40. A polymeric product according to claim 34, which is obtainable by further polymerizing a copolymer according to claim 1 through the polymerizable unsaturated group in the presence of a crosslinking agent containing at least two unsaturated groups.

41. A polymeric product according to claim 34, which comprises at least one vinylic comonomer and at least one cross-linking agent.

42. A moulding essentially comprising a polymeric product according to claim 34.

43. A moulding according to claim 42, which is an ophthalmic device for vision correction.

44. A moulding according to claim 42, which is a contact lens.

45. A moulding according to claim 44, which is a water-containing soft contact lens.

46. A moulding according to claim 44, which is low-water-content flexible, gas-permeable (RGP) contact lens.

47. A moulding according to claim 44 which is a highly $O_2$— permeable extended wear lens with favorable water permeability and good on-eye mobility.

48. A contact lens according to claim 47 having a bulk water content of 5 to 30, based on the total lens weight.

49. A moulding according to claim 42, which is an intraocular lens.

50. A moulding according to claim 42, which is a lenticular corneal implant (artificial cornea).

51. A biomedical article comprising a polymeric product according to claim 34.

52. A coating of an article, comprising the copolymer according to claim 1.

53. A coating of an article, comprising the polymeric product according to claim 34.

54. A contact lens comprising the copolymer according to claim 1.

* * * * *